US006927679B2

(12) United States Patent
Taguchi et al.

(10) Patent No.: US 6,927,679 B2
(45) Date of Patent: Aug. 9, 2005

(54) ID REGISTRATION METHOD, ID COLLATION SYSTEM INCORPORATED IN A VEHICLE CONTROL SYSTEM, EMBODIED AS A PNEUMATIC TIRE PRESSURE MONITORING APPARATUS ASSOCIATED WITH PNEUMATIC PRESSURE SENSORS, AND AN ID REGISTRATION TOOL COMBINED WITH PNEUMATIC TIRE PRESSURE MONITORING APPARATUS

(75) Inventors: Akihiro Taguchi, Oobu (JP); Shintarou Itou, Toyokawa (JP); Ryozo Okumura, Kariya (JP)

(73) Assignee: Denso Corporation, Kariya (JP)

( * ) Notice: Subject to any disclaimer, the term of this patent is extended or adjusted under 35 U.S.C. 154(b) by 11 days.

(21) Appl. No.: 10/602,699

(22) Filed: Jun. 25, 2003

(65) Prior Publication Data

US 2005/0099282 A1    May 12, 2005

(30) Foreign Application Priority Data

Jun. 26, 2002   (JP) .............................. 2002-185394

(51) Int. Cl.[7] ............................................. B60C 23/00
(52) U.S. Cl. ....................... 340/442; 340/445; 340/447; 340/825.69; 340/10.1; 73/146.2; 116/34 R
(58) Field of Search ............................... 340/10.1, 442, 340/445, 447, 443, 461, 525, 825.69, 825.72; 73/146.5, 146.2, 4; 116/34 R

(56) References Cited

U.S. PATENT DOCUMENTS

| 5,602,524 | A | 2/1997 | Mock et al. |
| 6,218,936 | B1 * | 4/2001 | Imao ........................... 340/447 |
| 6,271,748 | B1 | 8/2001 | Derbyshire |
| 6,275,148 | B1 * | 8/2001 | Takamura et al. .......... 340/442 |
| 6,505,507 | B1 * | 1/2003 | Imao et al. ................ 73/146.5 |
| 6,545,599 | B2 | 4/2003 | Derbyshire |
| 6,604,416 | B2 * | 8/2003 | Tsujita ....................... 73/146.5 |
| 6,707,390 | B2 * | 3/2004 | Hirohama et al. ...... 340/870.11 |
| 6,737,965 | B2 * | 5/2004 | Okubo ....................... 340/445 |

FOREIGN PATENT DOCUMENTS

| JP | 3-33381 | 2/1991 |
| JP | 6-195582 | 7/1994 |
| JP | 3212311 | 7/2001 |
| JP | A-2001-357471 | 12/2001 |

* cited by examiner

*Primary Examiner*—Davetta W. Goins
(74) *Attorney, Agent, or Firm*—Posz Law Group, PLC

(57) ABSTRACT

A transmitter mode switching apparatus switches a transmitter into an ID registration mode, while a receiver mode switching apparatus switches a receiver into an ID transmission mode (step S1). Then, a collation ID to be transmitted from the receiver is set based on an ID assigned inherently to the receiver (step S2). Subsequently, an ID transmitting apparatus of the receiver transmits the collation ID (step S3). An ID receiving apparatus of the transmitter receives the collation ID (step S4). An ID registration apparatus of the transmitter stores the received collation ID as a registered ID of the transmitter (step S5). After the ID registration is accomplished, the transmitter mode switching apparatus returns the transmitter to an ordinary mode, while the receiver mode switching apparatus returns the receiver to an ordinary mode (step S6).

23 Claims, 21 Drawing Sheets

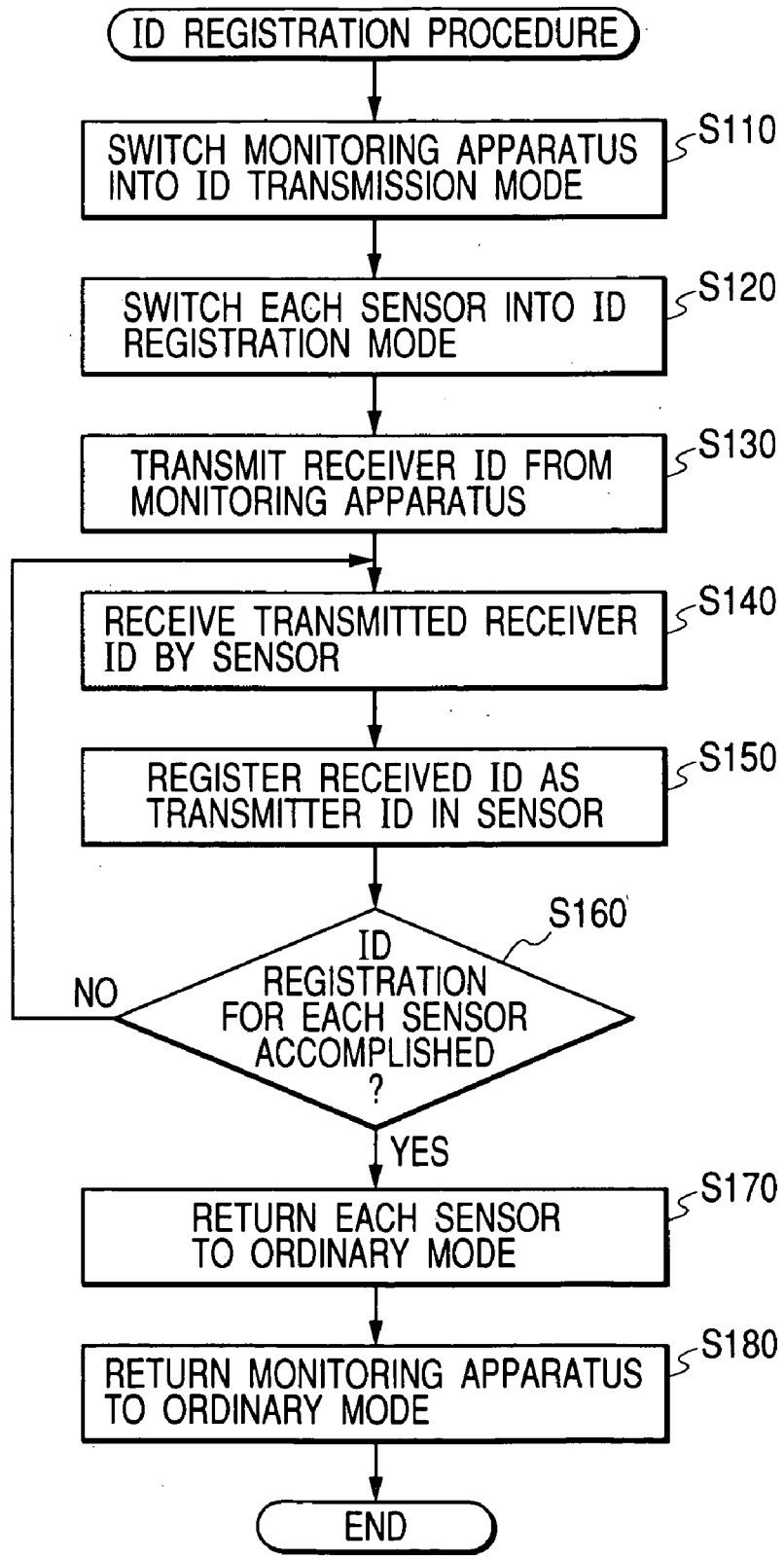

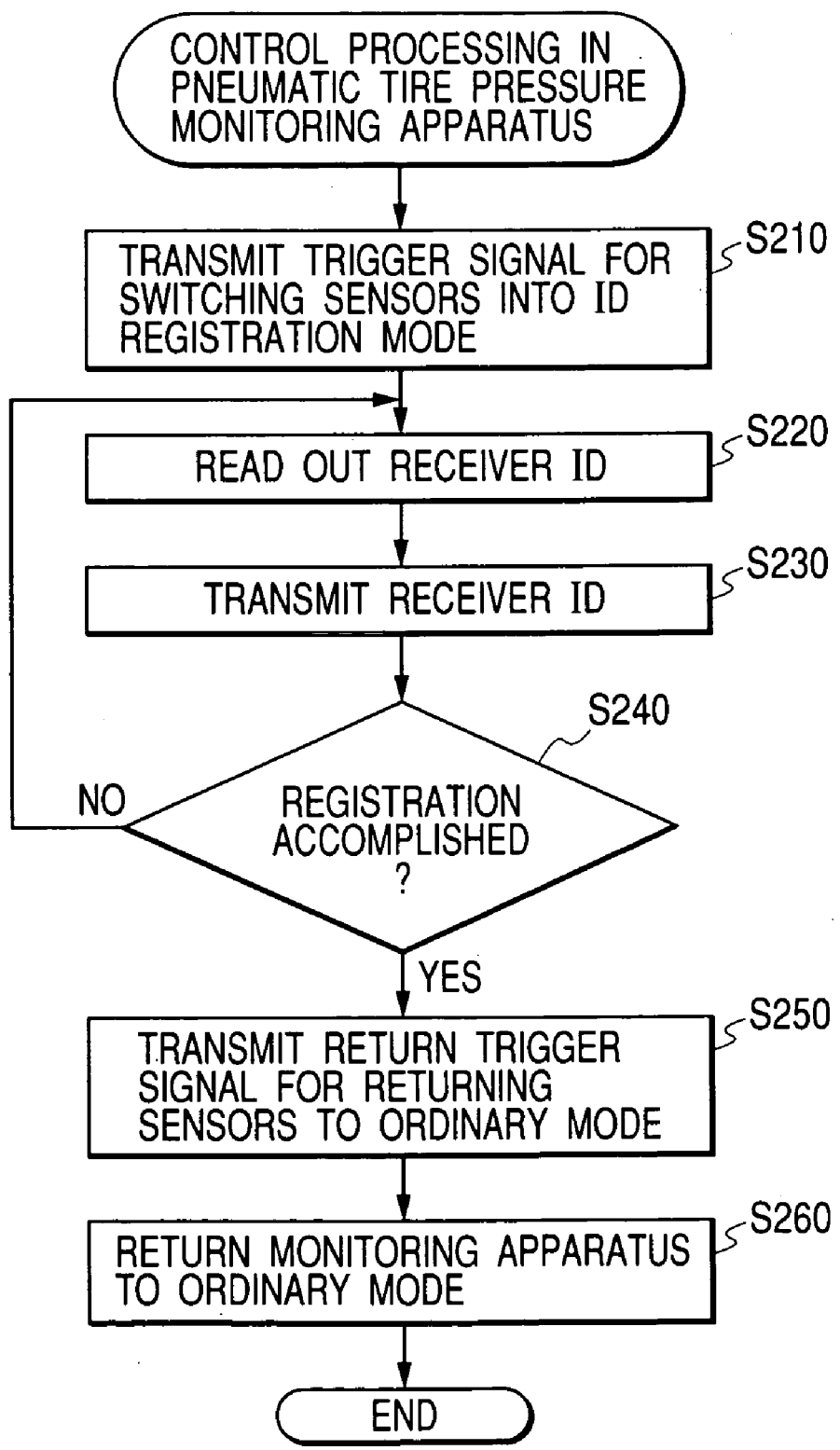

ID REGISTRATION METHOD, ID COLLATION SYSTEM INCORPORATED IN A VEHICLE CONTROL SYSTEM, EMBODIED AS A PNEUMATIC TIRE PRESSURE MONITORING APPARATUS ASSOCIATED WITH PNEUMATIC PRESSURE SENSORS, AND AN ID REGISTRATION TOOL COMBINED WITH PNEUMATIC TIRE PRESSURE MONITORING APPARATUS

BACKGROUND OF THE INVENTION

This invention relates to an ID (i.e., identification) registration method and an ID collation system incorporated in a vehicle control system, embodied as a pneumatic tire pressure monitoring apparatus associated with pneumatic pressure sensors. More specifically, the present invention relates to a pneumatic tire pressure monitoring system monitoring the pneumatic pressure of a tire, an electronic key system performing contactless lock/unlock of a door, and a vehicle security control system controlling the pneumatic tire pressure monitoring system and the electronic key system.

A conventional pneumatic tire pressure monitoring system is, for example, disclosed in Japanese Patent No. 3212311 corresponding to U.S. Pat. No. 5,602,524.

According to this kind of conventional pneumatic tire pressure monitoring system, a pneumatic pressure sensor equipped with a transmitter is attached to each tire. The pneumatic pressure sensor transmits an air-pressure detection signal together with an ID assigned to this sensor. A pneumatic tire pressure monitoring apparatus installed in a vehicle body receives the air-pressure detection signal. When any abnormal tire having a lower air pressure is detected, a warning indicator is turned on.

In this case, each sensor ID is also registered in the pneumatic tire pressure monitoring apparatus, so that the monitoring apparatus can check whether or not the received air-pressure signal is transmitted from the tire of its own vehicle.

According to the above conventional system, the sensor ID is assigned to each sensor at the shipment or delivery stage of this sensor from a sensor maker. Then, this sensor is installed into a designated vehicle in an automobile maker. In this assembling process, the pneumatic tire pressure monitoring apparatus installed in a vehicle body is switched into an ID registration mode so that the ID transmitted from the sensor can be received by the monitoring apparatus and the received ID can be registered in the monitoring apparatus.

More specifically, as shown in FIG. 20, the conventional pneumatic tire pressure monitoring system includes a plurality of pneumatic pressure sensors 110, 120, 130, and 140 attached to respective tires and a pneumatic tire pressure monitoring apparatus 150 installed in a vehicle body. The pneumatic pressure sensor 110 includes an air pressure sensor 111 detecting the air pressure of a tire, an ID memory 112 storing a registered sensor ID, a transmitting circuit 113, a power source battery 114, a control unit 115, and a transmitting antenna 116. Other pneumatic pressure sensors 120, 130, and 140 are identical in arrangement with the sensor 110.

The pneumatic tire pressure monitoring apparatus 150 includes a receiving circuit 151, a receiving antenna 152, a power source circuit 153, a control unit 154, a memory 155, and a communication circuit 156. The communication circuit 156 is connected via a signal line to a display unit 160 such as an indicator or LED to transmit display data to the display unit 160. A vehicle battery 170, supplying electric power, is connected to the pneumatic tire pressure monitoring apparatus 150. A mode changing switch 180 is provided to switch the operation of the control unit 154 between an ordinary mode and an ID registration mode.

The ID registration is performed in an automobile manufacturing line in accordance with a procedure shown in FIG. 21. First of all, the pneumatic tire pressure monitoring apparatus 150 is switched into an ID registration mode (step S5110). Next, respective pneumatic pressure sensors 110, 120, 130, and 140 transmit their sensor IDs stored in their ID memories (step S5120) into the air. The pneumatic tire pressure monitoring apparatus 150 receives the sensor IDs via the receiving antenna 152 (step S5130). Then, the control unit 154 of the pneumatic tire pressure monitoring apparatus 150 makes a judgment as to whether or not the received signal has a level equal to or larger than a reference level (step S5140). When the received signal level is not smaller than the reference level (i.e., YES in step S5140), the sensor ID included in the received signal is registered in the memory 155 of the pneumatic tire pressure monitoring apparatus 150 (step S5150). Then, the control unit 154 makes a judgment as to whether or not the registration of the sensor IDs of respective sensors 110, 120, 130, and 140 has been accomplished (step S5160). When the ID registration for respective sensors 110, 120, 130, and 140 is already accomplished (YES in step S5160), the mode changing switch 180 is switched to return the monitoring apparatus 150 to the ordinary mode (step S5170).

In this manner, according to the conventional system, the sensor ID of the pneumatic pressure sensor actually attached to each tire of a vehicle is registered in the monitoring apparatus. In the ordinary mode, the monitoring apparatus checks whether or not the ID contained in each signal received through the receiving antenna 152 agrees with a collation ID stored in the memory 155. When the agreement is recognized, the air-pressure condition of the tire is judged based on a received pressure signal. Display of the display unit 160 is performed based on the judgment result. Registering the collation ID as described above is effective in preventing erroneous display performed based on a signal transmitted from a pneumatic pressure sensor attached to a tire of any other vehicle traveling or stopping nearby.

However, many vehicles are successively conveyed on the same assembling line at short intervals of time. Performing the registration of collation ID in such a congested condition will be possibly subjected to the problem of interference occurring in radio data transmission, according to which the monitoring apparatus of a vehicle may erroneously receive the ID signal sent from a pneumatic pressure sensor of a neighboring vehicle. The similar problem occurs in a repair shop in which the re-registering operation of the collation ID is performed.

Furthermore, electronic keys are recently used for controlling automotive vehicles by performing radio or wireless communication between the electronic key and an automotive security control computer (i.e., security ECU). For example, the electronic key allows a user to open or close an automotive door without inserting the key into a key cylinder. Furthermore, it is known that the electronic key can be used to start the engine before the user enters into the car. According to such an electronic key system, a key ID of the authorized electronic key is registered in the security ECU. Then, the security ECU performs ID collection with reference to the registered key ID when communicating with the electronic key. Thus, even in such an electronic key system, it is necessary to eliminate erroneous ID registration.

The employment of such an electronic key system is not limited to automotive vehicles. For example, a similar key system can be applied to an entrance door of a house in which a security computer is installed. Even in such a housing security system, the ID collation is performed with reference to ID information registered beforehand for an authorized key.

SUMMARY OF THE INVENTION

In view of the above-described problems, the present invention has an object to eliminate ID erroneous registration in an ID collation system which includes a receiver receiving an ID transmitted from a transmitter and performs predetermined processing based on check result with reference to collation ID. More specifically, the present invention has an object to make it easy to register the ID when a transmitter is newly added or the transmitter is modified.

In order to accomplish the above and other related objects, the present invention provides an ID (i.e., identification) registration method for an ID collation system which includes a receiver receiving information transmitted from a transmitter, checks an ID contained in the information received by the receiver, and performs predetermined processing designated by the information based on check result of ID. The ID registration method of the present invention includes a step of switching the transmitter into an ID registration mode and also switching the receiver into an ID transmission mode, a step of causing the receiver to transmit a collation ID determined based on an ID assigned inherently to the receiver, and a step of causing the transmitter to receive the collation ID transmitted from the receiver and store the received collation ID as a registered ID of the transmitter.

The ID registration method of the present invention is opposed in the way of registration to a conventional registration method according to which a transmitter ID is sent from a transmitter to a receiver and registered in the receiver. In other words, the present invention brings the transmitter and the receiver into a reversed master/slave relationship so that a collation ID is transmitted from the receiver to the transmitter, not from the transmitter to the receiver. Namely, the collation ID is stored in the receiver (i.e., master) and the collation ID is transmitted from the receiver to the transmitter (i.e., slave) and registered in the transmitter. The collation ID transmitted from the receiver to the transmitter is, for example, ① an ID registered beforehand in the receiver or ② an ID newly produced by the receiver and registered in the receiver when it is transmitted to the transmitter.

According to the ID registration method of the present invention, it becomes possible to surely prevent the ID registration from being erroneously performed in the receiver. No transmitter ID of other transmitter is registered. Thus, the erroneous ID registration is effectively eliminated. When a faulty transmitter is replaced by a new one, the collation ID stored in the receiver is registered in the new transmitter according to the above-described procedure. Thus, the maintenance is easy.

In the ID registration method of the present invention, the collation ID stored in the receiver is determined based on the ID assigned inherently to the receiver. The ID assigned inherently to the receiver is discriminable from other IDs of receivers installed in other vehicles. Thus, an objective vehicle is discriminable from other vehicles based on the ID assigned inherently to the receiver installed in this objective vehicle. In this case, the collation ID is completely identical with or partly includes "the ID assigned inherently to the receiver."

The above method of determining the collation ID based on the ID assigned inherently to the receiver is preferably employed in a case ① where there are a plurality of transmitters transmitting information used for controlling an apparatus or in a case ② where there are a plurality of different kinds of transmitters transmitting different information to control one or more apparatuses.

In both of the above cases ① and ②, administration and collation of ID in the receiver become easy. The process of judging whether or not a concerned transmitter is an authorized transmitter belonging to the system can be easily performed by checking whether or not the inherent ID of the receiver is contained in the received information. In the above case ①, the collation ID can be constituted by a code combining additional bit data with the inherent ID of the receiver. For example, using two-bit data makes it possible to discriminate a total of four transmitters from each other. Even in the above case ②, the above discrimination among the transmitters becomes feasible by adding a bit or bits for discriminating the type of the transmitters.

To realize the ID registration method, the present invention provides an ID collation system including a transmitter for transmitting information, a receiver for receiving the information transmitted from the transmitter, a control apparatus for checking an ID contained in the information received by the receiver and performing predetermined processing designated by the information based on check result of ID. The ID collation system of the present invention includes a transmitter mode switching apparatus for switching the transmitter into an ID registration mode and a receiver mode switching apparatus for switching the receiver into an ID transmission mode. The receiver includes an ID transmitting apparatus for transmitting a collation ID being determined based on an ID assigned inherently to the receiver and used in ID checking when the receiver is switched into the ID transmission mode by the receiver mode switching apparatus. The transmitter includes an ID receiving apparatus for receiving the collation ID transmitted from the receiver when the transmitter is switched into the ID registration mode by the transmitter mode switching apparatus, and an ID registration apparatus for storing the collation ID received by the ID receiving apparatus as a registered ID of the transmitter.

When the ID registration is performed by the above ID collation system of the present invention, as shown in FIG. 1, the transmitter mode switching apparatus switches the transmitter into the ID registration mode while the receiver mode switching apparatus switches the receiver into the ID transmission mode (step S1). Then, the collation ID to be transmitted from the receiver is set (step S2). This step S2 can include one of the following processes.

(A) a process of reading out a collation ID registered beforehand in the receiver.

(B) a process of producing a collation ID to be registered in the receiver and setting the produced collation ID as transmission information. The produced collation ID is immediately or later registered in a memory of the receiver.

In any case, the collation ID is determined based on an ID assigned inherently to the receiver.

Subsequently, the ID transmitting apparatus of the receiver transmits the collation ID (step S3). Then, the ID receiving apparatus of the transmitter receives the collation ID (step S4). The ID registration apparatus of the transmitter stores the received collation ID as a registered ID of the transmitter (step S5). After the ID registration is accomplished, the transmitter mode switching apparatus returns the transmitter to the ordinary mode while the receiver mode switching apparatus returns the receiver to the ordinary mode (step S6).

Furthermore, to accomplish the above and other objects, the present invention provides a first vehicle control system including a transmitter for transmitting information required to control a device installed in a vehicle, a receiver installed in a vehicle body for receiving the information transmitted from the transmitter, a control apparatus installed in the vehicle body for checking an ID contained in the information received by the receiver with reference to a collation ID and executing control of the device according to the information based on check result of ID, a transmitter mode switching apparatus for switching the transmitter into an ID registration mode, and a receiver mode switching apparatus for switching the receiver into an ID transmission mode. Furthermore, the receiver includes an ID transmitting apparatus for transmitting the collation ID used in ID checking when the receiver is switched into the ID transmission mode by the receiver mode switching apparatus. The transmitter includes an ID receiving apparatus for receiving the collation ID transmitted from the receiver when the transmitter is switched into the ID registration mode by the transmitter mode switching apparatus, and an ID registration apparatus for storing the collation ID received by the ID receiving apparatus as a registered ID of the transmitter. Furthermore, according to the first vehicle control system of the present invention, the device installed in a vehicle is a pneumatic air pressure monitoring apparatus for displaying monitoring result with respect to an air pressure of a tire installed in the vehicle. The transmitter is incorporated in a pneumatic pressure sensor attached to the tire. And, the control apparatus executes control for the display of monitoring result with respect to the air pressure of the tire installed in the vehicle when the information received by the receiver is confirmed based on the result of ID checking as being transmitted from the pneumatic pressure sensor attached to the tire.

It is preferable that the collation ID is transmitted to the transmitter via a transmitter antenna provided in a tire house of the vehicle. This arrangement is convenient when the ID is registered for each of four pneumatic pressure sensors attached to front-left, rear-left, rear-right, and front-right wheels of a vehicle.

Furthermore, the present invention provides a second vehicle control system including a transmitter for transmitting information required to control a device installed in a vehicle, a receiver installed in a vehicle body for receiving the information transmitted from the transmitter, a control apparatus installed in the vehicle body for checking an ID contained in the information received by the receiver with reference to a collation ID and executing control of the device according to the information based on check result of ID, a transmitter mode switching apparatus for switching the transmitter into an ID registration mode, and a receiver mode switching apparatus for switching the receiver into an ID transmission mode. Furthermore, the receiver includes an ID transmitting apparatus for transmitting the collation ID used in ID checking when the receiver is switched into the ID transmission mode by the receiver mode switching apparatus. The transmitter includes an ID receiving apparatus for receiving the collation ID transmitted from the receiver when the transmitter is switched into the ID registration mode by the transmitter mode switching apparatus, and an ID registration apparatus for storing the collation ID received by the ID receiving apparatus as a registered ID of the transmitter. Furthermore, according to the second vehicle control system of the present invention, the device installed in a vehicle is a keyless entry apparatus for executing contactless lock/unlock of a vehicle door, the transmitter is incorporated in an electronic key, and the control apparatus executes the contactless lock/unlock of the vehicle door based on checking result of ID of the electronic key contained in the information received by the receiver.

Furthermore, the present invention provides a third vehicle control system including a transmitter for transmitting information required to control a device installed in a vehicle, a receiver installed in a vehicle body for receiving the information transmitted from the transmitter, a control apparatus installed in the vehicle body for checking an ID contained in the information received by the receiver with reference to a collation ID and executing control of the device according to the information based on check result of ID, a transmitter mode switching apparatus for switching the transmitter into an ID registration mode, and a receiver mode switching apparatus for switching the receiver into an ID transmission mode. The receiver includes an ID transmitting apparatus for transmitting the collation ID used in ID checking when the receiver is switched into the ID transmission mode by the receiver mode switching apparatus. The transmitter includes an ID receiving apparatus for receiving the collation ID transmitted from the receiver when the transmitter is switched into the ID registration mode by the transmitter mode switching apparatus, and an ID registration apparatus for storing the collation ID received by the ID receiving apparatus as a registered ID of the transmitter. Furthermore, according to the third vehicle control system of the present invention, the device installed in a vehicle includes a pneumatic air pressure monitoring apparatus for displaying monitoring result with respect to an air pressure of a tire installed in the vehicle and a keyless entry apparatus for executing contactless lock/unlock of a vehicle door. The transmitter is incorporated in a pneumatic pressure sensor attached to the tire and also in an electronic key. And, the control apparatus executes control for the display of monitoring result with respect to the air pressure of the tire installed in the vehicle when the information received by the receiver is confirmed based on the result of ID checking as being transmitted from the pneumatic pressure sensor attached to the tire, and also executes the contactless lock/unlock of the vehicle door when the information received by the receiver is confirmed based on the result of ID checking as being transmitted from an authorized electronic key.

It is preferable that the collation ID is determined based on an ID assigned inherently to the receiver. Administration of ID in the receiver becomes easy. The ID collation processing for checking whether or not a concerned transmitter belongs to the receiver can be easily done.

For example, according to the electronic key system, it is possible to register a plurality of authorized electronic keys. In such a case, the same ID (i.e., the ID inherent to the receiver) is registered in each authorized electronic key. The receiver is required to perform the ID collation processing commonly for all of the authorized electronic keys. The processing becomes simple. Meanwhile, if it is necessary to discriminate each of the authorized electronic keys, it will be preferable that the collation ID for each key includes additional bit data for identifying each key.

Furthermore, according to the pneumatic tire pressure monitoring system, a total of four transmitters are required for the wheels of a four-wheel vehicle. In this case, the processing for identifying whether or not a signal arrives from the pneumatic pressure sensor attached to a tire of this vehicle becomes simple. In general, to precisely perform the pneumatic tire pressure monitoring operation, it is preferable to discriminate each of the wheels. In such a case, two-bit additional code for discriminating each wheel can be added to the collation ID.

Furthermore, a security control system executes control processing for different kinds of devices, such as a combination of the pneumatic tire pressure monitoring system and the electronic key system. In such a security control system, it is possible to use the same ID for the pneumatic pressure sensor and the electronic key. The processing becomes simple. The administration becomes simple, too.

It is preferable that the collation ID is transmitted from the receiver to the transmitter via a predetermined external device. For example, the external device is an ID registration tool carried by an operator or a worker. First of all, the ID registration tool is placed near a receiver to receive the collation ID transmitted from the receiver. Then, this tool is carried to the vicinity of a transmitter and the registered collation ID is transmitted to the transmitter. The ID registration is accomplished in this manner.

Furthermore, it is preferable that the external device is detachably connected via a signal line to the receiver and to the transmitter. Using a signal line or a comparable cable is effective to surely eliminate interference occurring in data transmission.

In the system executing the ID registration by cable, it is preferable that the transmitter mode switching apparatus is provided in the transmitter while the receiver mode switching apparatus is provided in the receiver, and the external device includes a trigger signal transmitting apparatus which transmits a trigger signal for causing the transmitter mode switching apparatus to switch the transmitter into the ID registration mode and a trigger signal for causing the receiver mode switching apparatus to switch the receiver into the ID transmission mode. The ID registration can be smoothly performed.

Furthermore, to accomplish the above and other related objects, the present invention provides a pneumatic tire pressure monitoring apparatus including a receiver for receiving an air-pressure signal transmitted together with a sensor ID from a pneumatic pressure sensor of each tire installed in a vehicle, a control apparatus for checking whether or not a received sensor ID agrees with the sensor ID of the pneumatic pressure sensor of the tire installed in the vehicle and for executing control for monitoring an air pressure of the tire with reference to the air-pressure signal based on check result of ID, a receiver mode switching apparatus for switching the receiver into an ID transmission mode, and an ID transmitting apparatus for transmitting a collation ID used in ID checking when the receiver is switched into the ID transmission mode by the receiver mode switching apparatus, wherein the collation ID is determined based on an ID assigned inherently to the receiver.

According to the pneumatic tire pressure monitoring apparatus of the present invention, in a vehicle assembling line, the receiver mode switching apparatus switches the receiver into the ID transmission mode. Then, the ID transmitting apparatus transmits a collation ID used in ID checking to the pneumatic pressure sensor, thereby performing the ID registration.

Furthermore, as the collation ID is determined based on the ID assigned inherently to the receiver, administration of ID is easy.

Furthermore, to accomplish the above and other related objects, the present invention provides a pneumatic tire pressure sensor including a pressure sensor for detecting an air pressure of a tire, an ID memory for storing a transmitter ID, a transmitting circuit for transmitting the air pressure of the tire detected by the pressure sensor together with the transmitter ID stored in the ID memory, a receiving circuit for receiving a collation ID transmitted from a pneumatic tire pressure monitoring apparatus, and a transmitter ID registering apparatus for registering the collation ID received via the receiving circuit as a transmitter ID and storing the registered transmitter ID in the ID memory.

According to the pneumatic tire pressure sensor of the present invention, the collation ID stored in the pneumatic tire pressure monitoring apparatus is registered in the transmitter as a transmitter ID. Especially, when the sensor is replaced by a new one, the ID registration is accurately and easily performed between the pressure sensor and the monitoring apparatus.

It is, for example, preferable that the receiving circuit receives a signal via a cable and the ID memory is a rewritable memory element having an overwriting function for renewing the data stored therein. Erroneous registration due to interference occurring in data transmission can be surely eliminated.

Furthermore, to accomplish the above and other related objects, the present invention provides an ID registration tool for a pneumatic tire pressure monitoring system including a pneumatic pressure sensor attached to a tire of a vehicle and a pneumatic tire pressure monitoring apparatus installed in a vehicle body to receive an air-pressure signal transmitted from the pneumatic pressure sensor together with a transmitter ID of the pneumatic pressure sensor, thereby monitoring an air pressure of the tire, in which the ID registration tool is used for registering a collation ID between the pneumatic tire pressure monitoring apparatus and the pneumatic pressure sensor. The ID registration tool of the present invention includes an ID transmission requesting apparatus for requesting the pneumatic tire pressure monitoring apparatus to transmit the collation ID used in ID checking, an ID receiving circuit for receiving the collation ID transmitted from the pneumatic tire pressure monitoring apparatus in response to a request of the ID transmission requesting apparatus, and an ID transmitting circuit for transmitting the collation ID received by the ID receiving circuit to the pneumatic pressure sensor.

According to the ID registration tool for a pneumatic tire pressure monitoring system, the ID transmission requesting apparatus requests the pneumatic tire pressure monitoring apparatus to transmit the collation ID. The ID receiving circuit receives the collation ID transmitted from the pneumatic tire pressure monitoring apparatus in response to the request of the ID transmission requesting apparatus. The ID transmitting circuit transmits the received collation ID to the pneumatic pressure sensor. The ID used in the collation in the pneumatic tire pressure monitoring control can be easily registered between the pneumatic tire pressure monitoring apparatus and the pneumatic pressure sensor. As a result, in the case of exchanging pneumatic pressure sensors or in the case of rotating the position of the tires, the ID registration can be accurately performed.

The ID collation system of the present invention is not limited to the above-described vehicle control system and accordingly can be applied, for example, to the ID registration of an electronic key in a contactless lock/unlock system for an entrance door of a house. Furthermore, it is needless to say that the ID collation system of the present invention can be also applied to various control systems other than vehicles.

BRIEF DESCRIPTION OF THE DRAWINGS

The above and other objects, features and advantages of the present invention will become more apparent from the following detailed description which is to be read in conjunction with the accompanying drawings, in which:

FIG. 4 is a flowchart showing ID registration procedure in accordance with the first embodiment of the present invention;

FIG. 5 is a flowchart showing the contents of control processing executed in the pneumatic tire pressure monitoring apparatus to realize the ID registration procedure shown in FIG. 4;

DESCRIPTION OF THE PREFERRED EMBODIMENTS

Preferred embodiments of the present invention will be explained hereinafter with reference to attached drawings.

Figure 1:
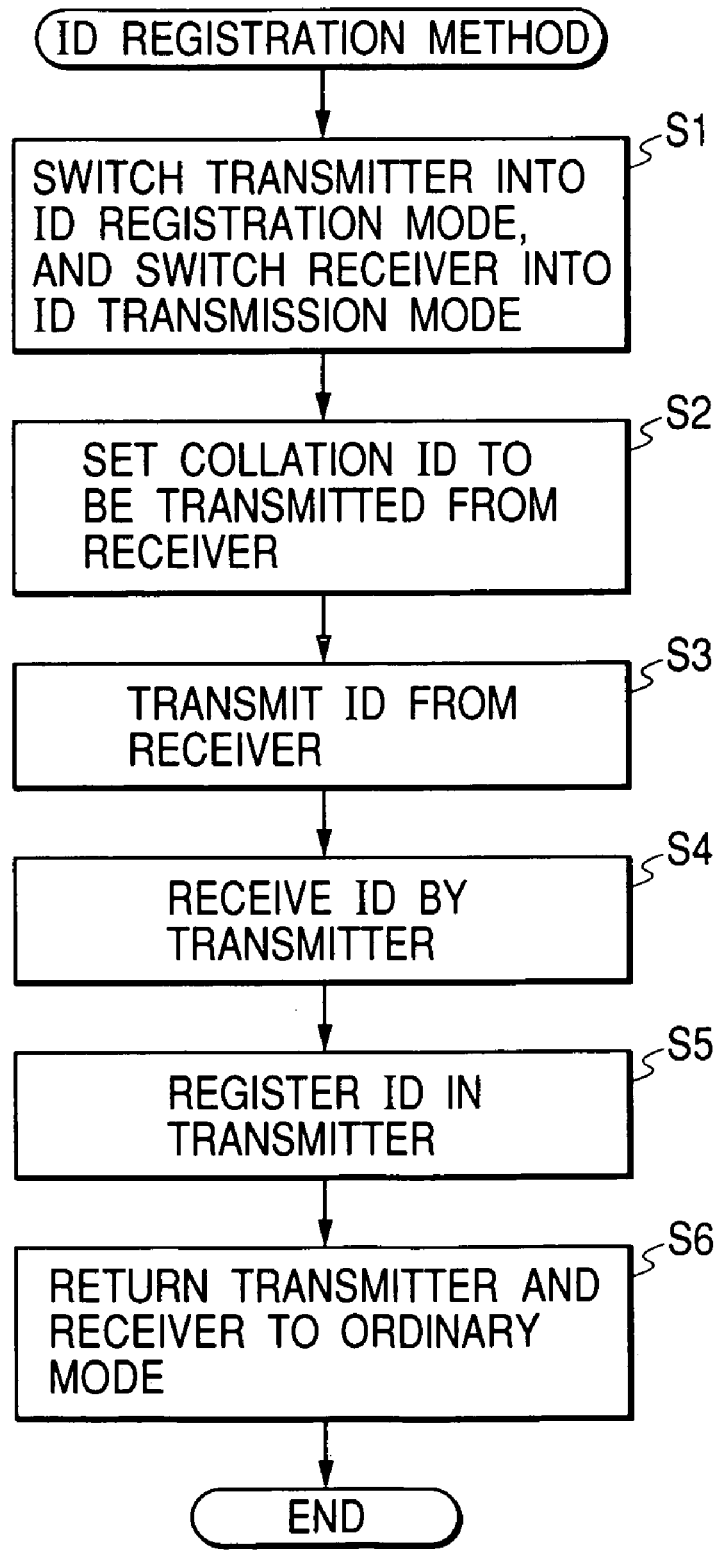
FIG. 1 is a flowchart showing the procedure of ID registration executed in an ID collating system in accordance with the present invention.
Figure 2:
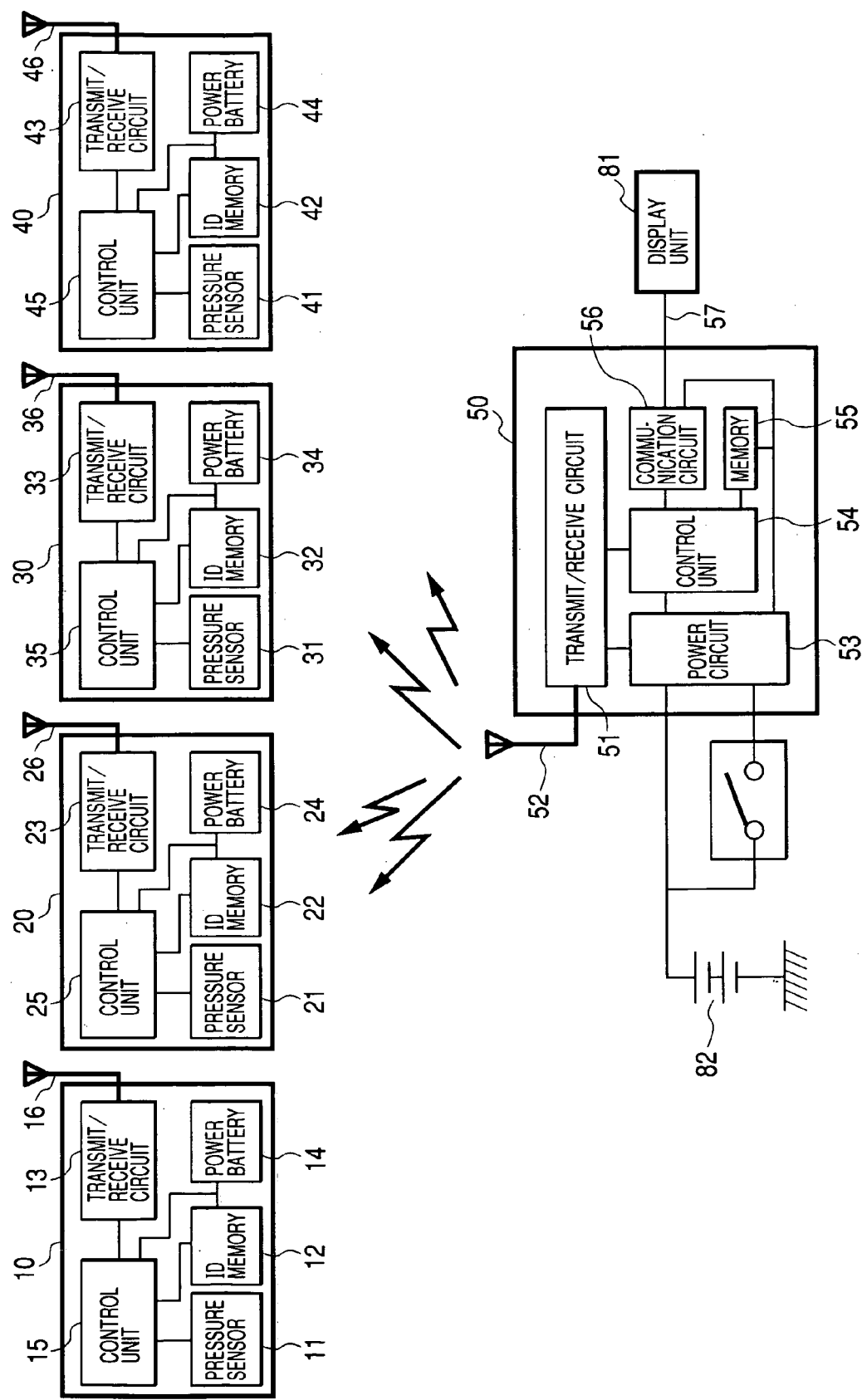
FIG. 2 is a block diagram showing a pneumatic tire pressure monitoring system in accordance with a first embodiment of the present invention.

FIG. 2 is a block diagram showing a schematic arrangement of a pneumatic tire pressure monitoring system in accordance with a first embodiment of the present invention. As shown in FIG. 2, the pneumatic tire pressure monitoring system includes a plurality of pneumatic pressure sensors (i.e., transmitters) 10, 20, 30, and 40, and a pneumatic tire pressure monitoring apparatus (i.e., receiver) 50 equipped in a vehicle body. The pneumatic pressure sensor 10 includes an air pressure sensor 11 detecting the air pressure of a tire, an ID memory 12 storing a registered sensor ID, a transmit/receive circuit 13, a power source battery 14, a control unit 15, and a transmit/receive antenna 16. The pneumatic pressure sensor 20 includes an air pressure sensor 21 detecting the air pressure of a tire, an ID memory 22 storing a registered sensor ID, a transmit/receive circuit 23, a power source battery 24, a control unit 25, and a transmit/receive antenna 26. The pneumatic pressure sensor 30 includes an air pressure sensor 31 detecting the air pressure of a tire, an ID memory 32 storing a registered sensor ID, a transmit/receive circuit 33, a power source battery 34, a control unit 35, and a transmit/receive antenna 36. And, the pneumatic pressure sensor 40 includes an air pressure sensor 41 detecting the air pressure of a tire, an ID memory 42 storing a registered sensor ID, a transmit/receive circuit 43, a power source battery 44, a control unit 45, and a transmit/receive antenna 46.

Figure 20:
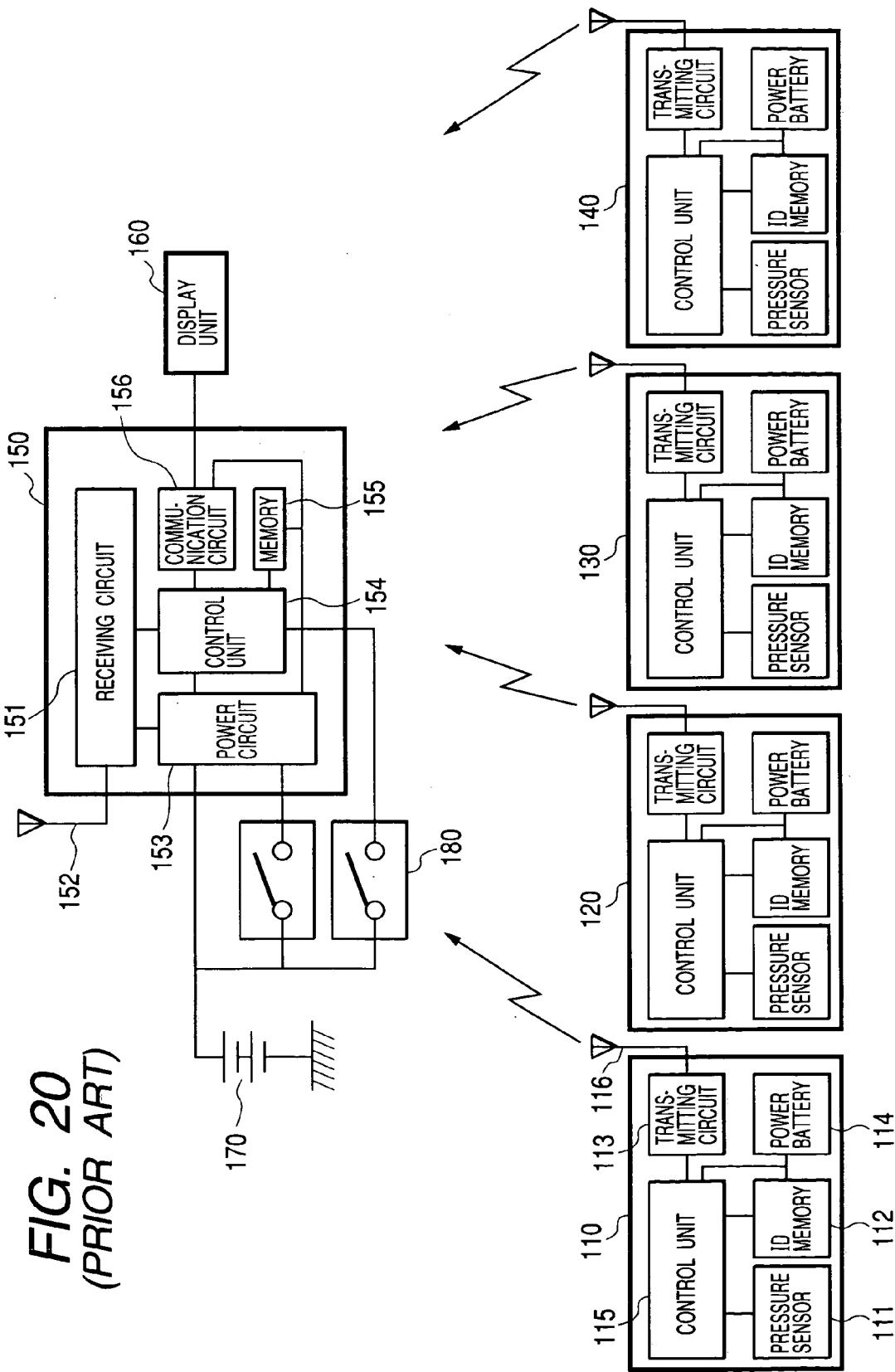
FIG. 20 is a block diagram showing a conventional pneumatic tire pressure monitoring system.
Figure 21:
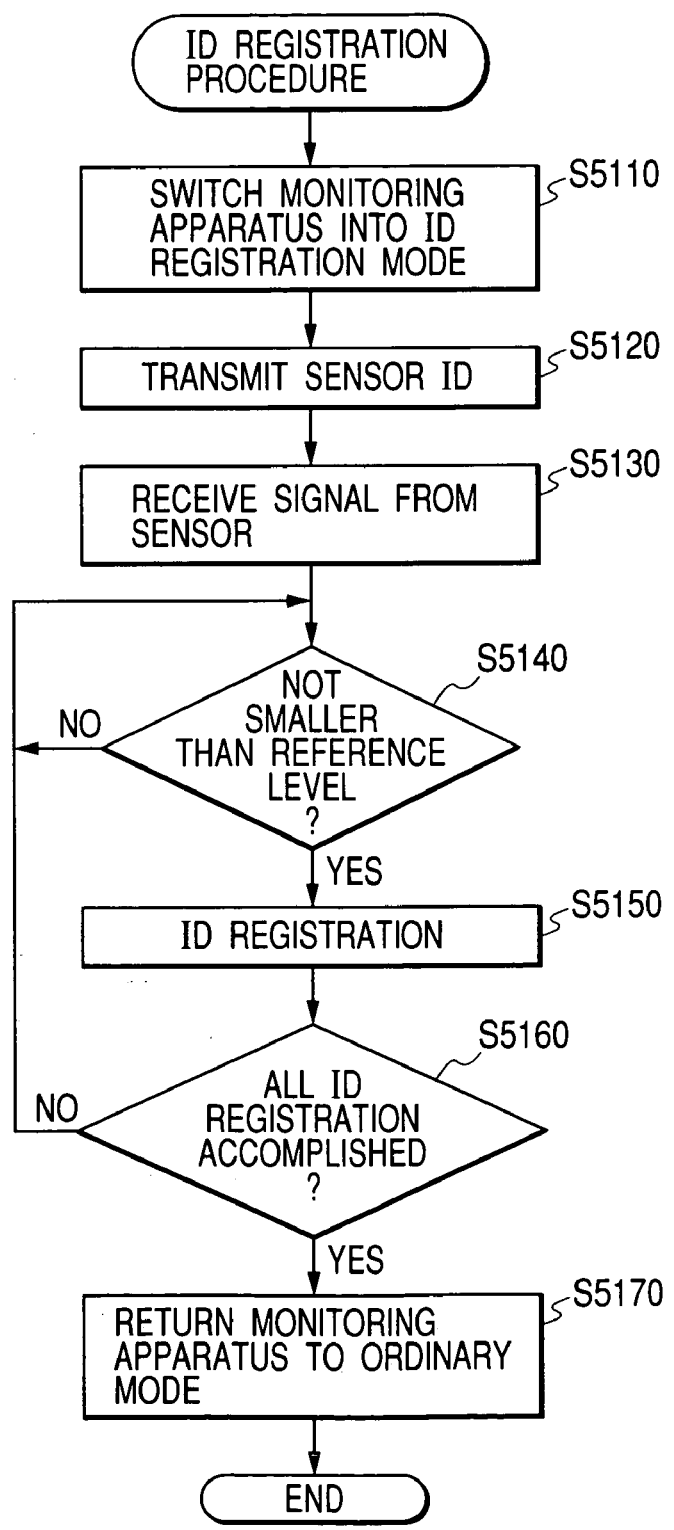
FIG. 21 is a flowchart showing the contents of conventional ID registration procedure.

Compared with a conventional pneumatic pressure sensor 110 shown in FIG. 20, the pneumatic pressure sensors 10, 20, 30, and 40 of this embodiment is characterized in that the transmit/receive circuits 13, 23, 33, and 43 have the capability of not only transmitting information, data, and signals but also receiving the same. It is needless to say that the transmit/receive antennas 16, 26, 36, and 46 are for transmitting and receiving the information, data, and signals. Each of the transmit/receive antennas 16, 26, 36, and 46 is a mouth piece of a valve through which the air is introduced into a tire. Each of ID memories 12, 22, 32, and 42 is an EEPROM (i.e., Electrically Erasable and Programmable Read Only Memory) or a comparable rewritable memory element which is nonvolatile and has an overwriting function for renewing the data stored therein.

The pneumatic tire pressure monitoring apparatus 50 includes a transmit/receive circuit 51, a transmit/receive antenna 52, a power source circuit 53, a control unit 54, a memory 55, and a communication circuit 56. The communication circuit 56 is connected a via signal line 57 to a display unit 81 such as an indicator or LED to transmit display data to the display unit 81. The communication circuit 56 also has a function of receiving a signal representing the display condition from the display unit 81. A vehicle battery 82, supplying electric power, is connected to the pneumatic tire pressure monitoring apparatus 50. The memory 55 stores a receiver ID assigned inherently to the pneumatic tire pressure monitoring apparatus 50.

Figure 3A:
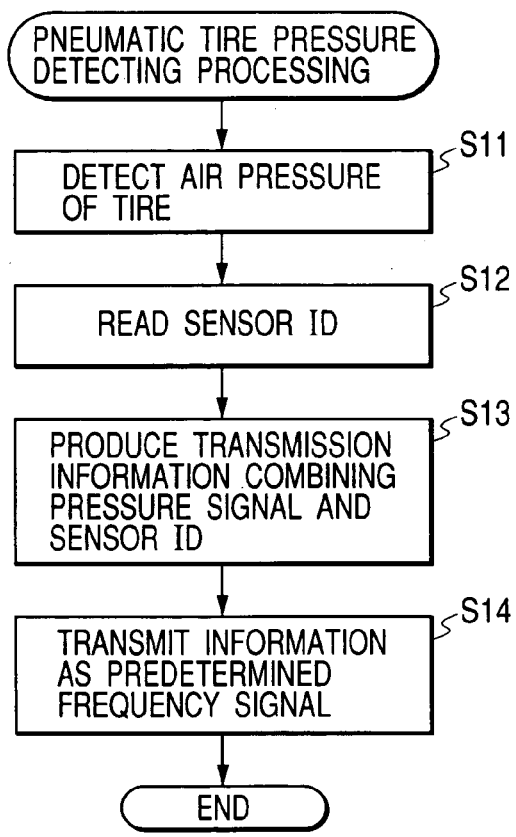
FIG. 3A is a flowchart showing pneumatic tire pressure detecting processing executed by a pneumatic tire pressure sensor of the pneumatic tire pressure monitoring system in accordance with the first embodiment of the present invention.
Figure 3B:
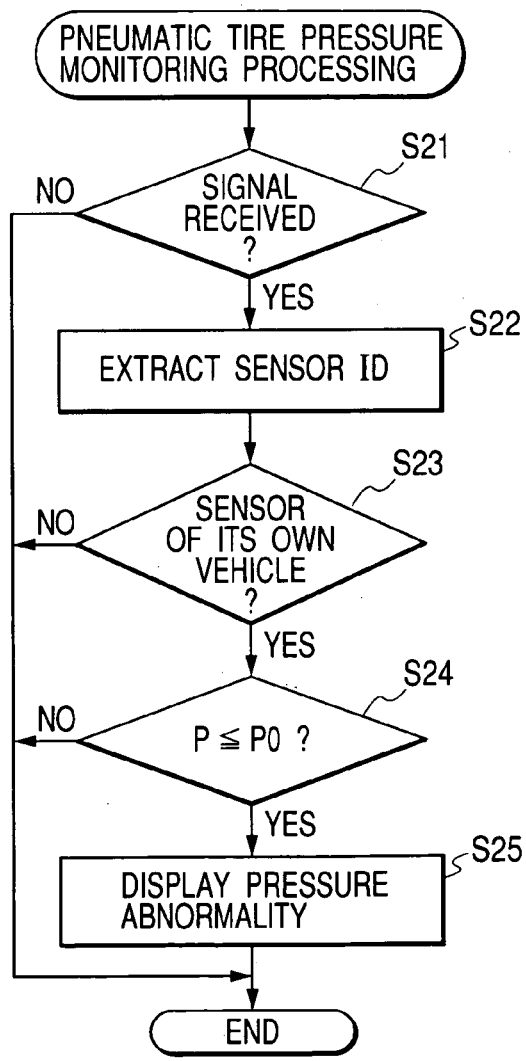
FIG. 3B is a flowchart showing pneumatic tire pressure monitoring processing executed by a pneumatic tire pressure monitoring apparatus of the pneumatic tire pressure monitoring system in accordance with the first embodiment of the present invention.

According to the pneumatic tire pressure monitoring apparatus 50, as shown in FIG. 3A, respective pneumatic pressure sensors 10, 20, 30, and 40 detect the air pressure of a corresponding tire (step S11), read the sensor ID registered in their associated ID memories 12, 22, 32, and 42 (step S12), produce transmission information as a combination of a detected pressure signal and the sensor ID (step S13), and transmit this transmission information as a signal of predetermined frequency at predetermined time intervals (step S14). The pneumatic tire pressure monitoring apparatus 50, as shown in FIG. 3B, checks whether or not the signal of predetermined frequency is received (step S21). When the signal of predetermined frequency is received (i.e., YES in step S21), the pneumatic tire pressure monitoring apparatus 50 extracts the sensor ID from the received signal (step S22), and compares the extracted sensor ID with a collation ID registered beforehand in the memory 55 to check whether or not the received signal is transmitted from any one of the sensors 10, 20, 30, and 40 equipped in its own vehicle (step S23). When the received signal is a signal transmitted from any one of the sensors 10, 20, 30, and 40 equipped in the own vehicle (i.e., YES in step S23), the pneumatic tire pressure monitoring apparatus 50 compares a momentary tire pressure P calculated based on the pressure signal contained in the received signal with a predetermined judgment value P0 (step S24). When the momentary tire pressure P is less than the judgment value P0 (i.e., YES in step P24), the pneumatic tire pressure monitoring apparatus 50 recognizes that the tire pressure is in the abnormal condition and causes the display unit 81 to indicate the state of abnormal pressure (step S25). When the judgment is NO in each of the steps S21, S23, and S24, the pneumatic tire pressure monitoring processing is terminated.

According to this embodiment, the collation ID used in the above pneumatic tire pressure monitoring processing is the receiver ID assigned inherently to the pneumatic tire pressure monitoring apparatus 50. This receiver ID is registered as a transmitter ID in each of the pneumatic pressure sensors 10, 20, 30, and 40.

The ID registration is performed in accordance with the procedure shown in the flowchart of FIG. 4.

First of all, the pneumatic tire pressure monitoring apparatus 50 is switched into an ID transmission mode (step S110). Respective pneumatic pressure sensors 10, 20, 30, and 40 are switched into an ID registration mode (step S120). Then, the pneumatic tire pressure monitoring apparatus 50 transmits the receiver ID (step S130). The receiver ID having been thus transmitted from the monitoring apparatus 50 is received by respective sensors 10, 20, 30, and 40 (step S140). The received receiver ID is registered as a transmitter ID in the ID memories 12, 22, 32, and 42 of respective sensors 10, 20, 30, and 40, respectively (step S150). The above processing in the steps S140 and S150 is repeated until the ID registration of all sensors 10, 20, 30, and 40 is accomplished (step S160). After the ID registration of respective sensors 10, 20, 30, and 40 is accomplished (i.e., YES in step S160), the sensors 10, 20, 30, and 40 are returned to the ordinary mode (step S170). The monitoring apparatus 50 is returned to the ordinary mode, too (step S180). Thus, the ID registration is accomplished.

Next, the contends of a program installed in the pneumatic tire pressure monitoring apparatus 50 to execute the above-described ID registration will be explained with reference to the flowchart shown in FIG. 5. Depressing a predetermined button provided on an operation panel of the pneumatic tire pressure monitoring apparatus 50 runs the following program. The depression of this button also makes the pneumatic tire pressure monitoring apparatus 50 change its operation from the ordinary mode to the ID transmission mode.

As shown in FIG. 5, the ID transmission mode processing includes transmission of a trigger signal for switching respective sensors 10, 20, 30, and 40 into the ID registration mode (step S210). The frequency of this trigger signal is identical with that used in the pneumatic tire pressure monitoring processing explained with reference to FIG. 3. Next, the receiver ID registered in the memory 55 is read out (step S220). The readout receiver ID is transmitted as a signal having the same frequency as that used in the pneumatic tire pressure monitoring processing (step S230). Then, it is checked whether or not a reply with respect to completion of the ID registration has arrived from respective sensors 10, 20, 30, and 40 (step S240). When no reply has arrived during a predetermined period of time (i.e., NO in step S240), the control procedure returns to the above step S220. On the other hand, when the reply with respect to completion of the ID registration has arrived (i.e., YES in step S240), a return trigger signal for returning respective sensors 10, 20, 30, and 40 to the ordinary mode is transmitted (step S250). The monitoring apparatus 50 is changed to the ordinary mode (step S260). Thus, the ID transmission mode processing is accomplished.

Figure 6:
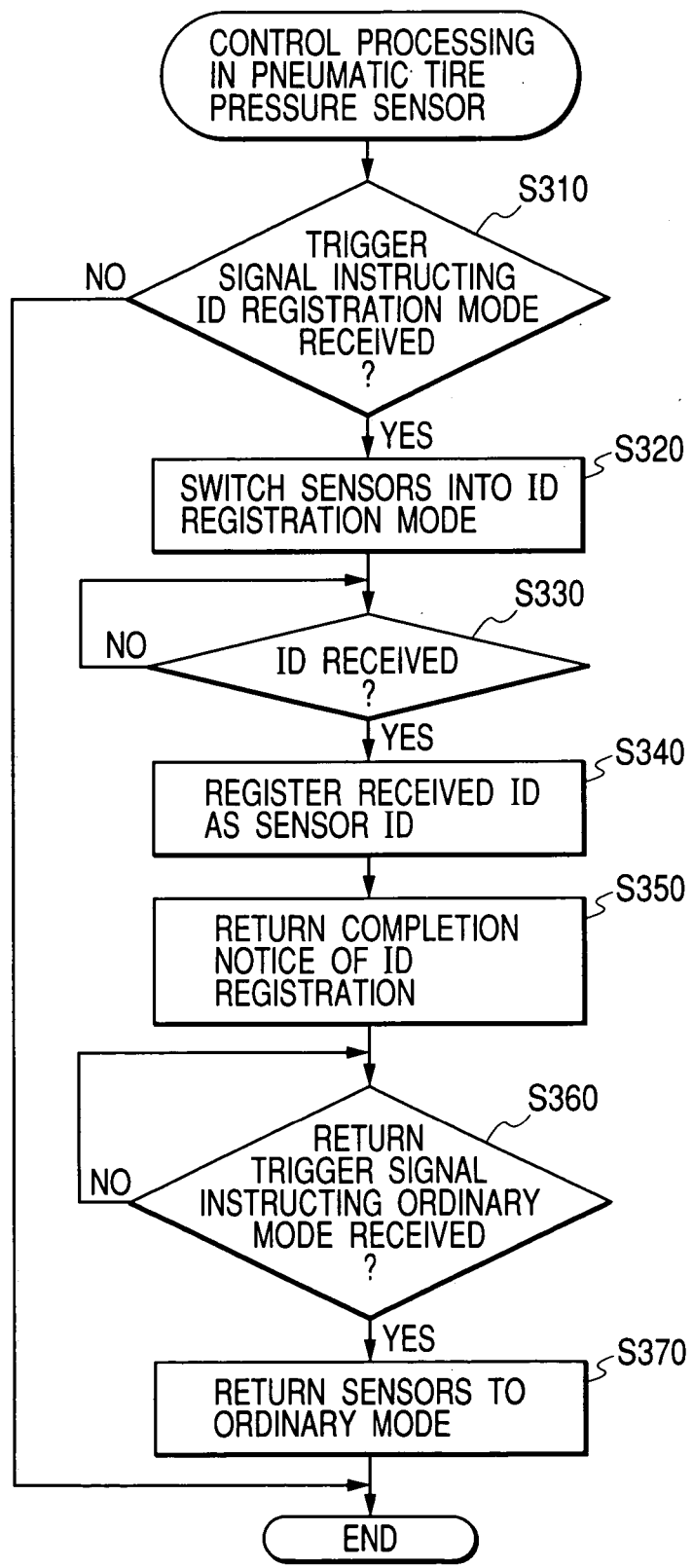
FIG. 6 is a flowchart showing the contents of control processing executed in the pneumatic tire pressure sensor to realize the ID registration procedure shown in FIG. 4.

Next, the contents of the control processing executed in respective sensors 10, 20, 30, and 40 will be explained. According to this control processing, as shown in FIG. 6, it is first checked whether or not the trigger signal for switching the operation into the ID registration mode has been received (step S310). When no trigger signal is received (i.e., NO in step S310), this control processing is terminated. When the trigger signal is received (i.e., YES in step S310), each of respective sensors 10, 20, 30, and 40 is switched into the ID registration mode (step S320). Then, it is checked whether or not the ID has been received (step S330). When the sensors 10, 20, 30, and 40 have received the ID (i.e., YES in step S330), the received ID is registered as sensor ID, i.e., transmitter ID, in their ID memories 12, 22, 32, and 42, respectively (step S340). Then, the completion notice of the ID registration is returned (step S350). This notice is returned as a signal combined with the transmitter ID registered in the above step S340. Thereafter, it is checked whether or not the return trigger signal for returning the operation to the ordinary mode has been received (step S360). When the return trigger signal has been received (i.e., YES in step S360), the sensors 10, 20, 30, and 40 are returned to the ordinary mode (step S370). Thus, the control processing of respective sensors 10, 20, 30, and 40 is accomplished.

In the above step S340, the ID registration is executed in such a manner to overwrite a previous ID having been already registered in respective ID memories 12, 22, 32, and 42. Accordingly, in an event that exchange or position rotation of tires is performed, a new ID to be re-registered in respective sensors 10, 20, 30, and 40 as well as in the monitoring apparatus 50 is newly issued by a repair shop or by a dealer.

According to this embodiment, as a result of the above-described control processing executed in the pneumatic tire pressure monitoring apparatus 50 and also in respective pneumatic pressure sensors 10, 20, 30, and 40, it becomes possible to register the transmitter ID based on the receiver ID. As a result that the transmitter ID agrees with the receiver ID, it becomes possible to easily register a correct transmitter ID to the pneumatic pressure sensor of a newly installed tire by executing the above-described control processing in the case that the tires are exchanged due to puncture or other reasons.

Figure 7:
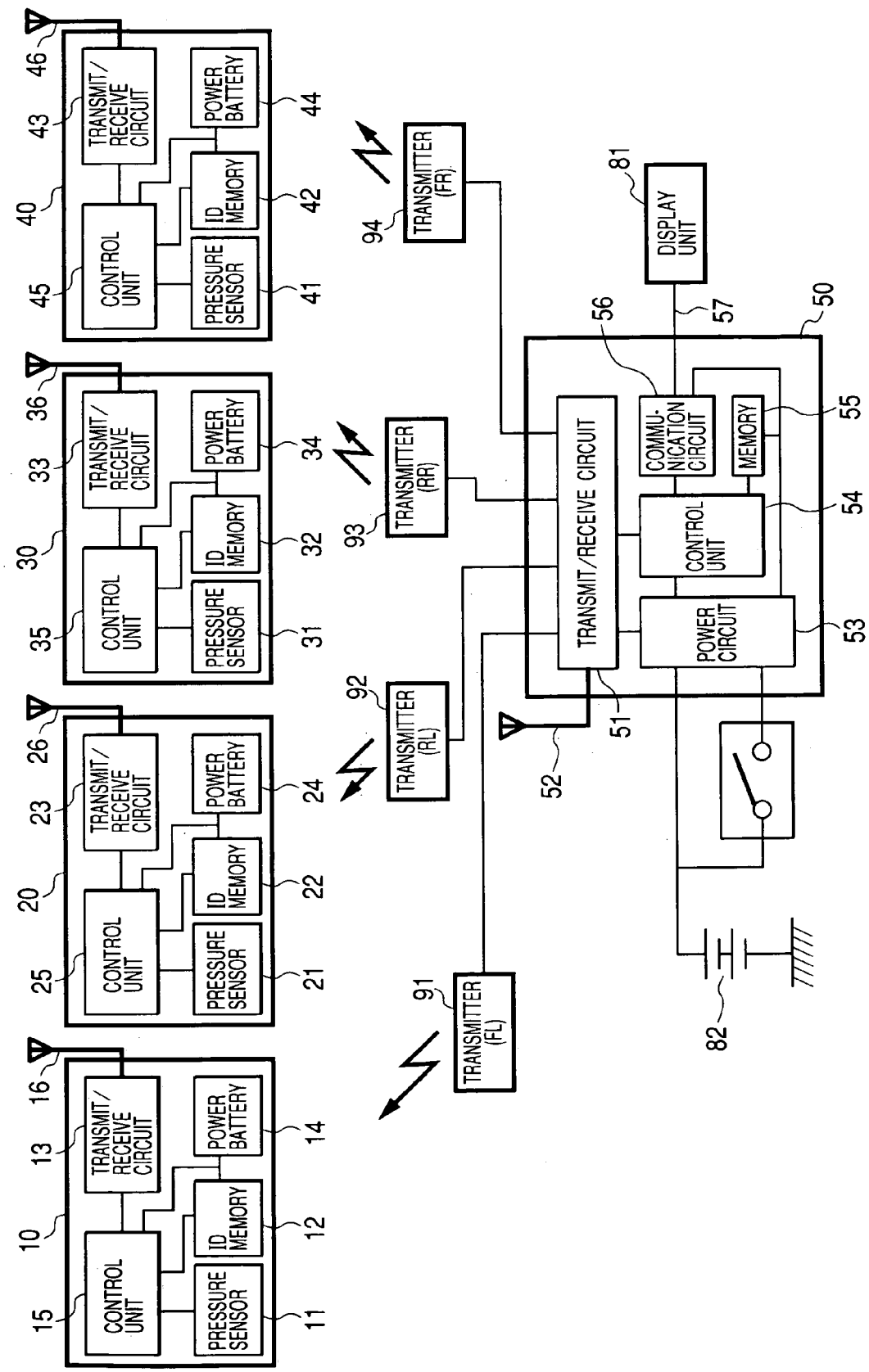
FIG. 7 is a block diagram showing a pneumatic tire pressure monitoring system in accordance with a second embodiment of the present invention.

Next, a second embodiment of the present invention will be explained. The pneumatic tire pressure monitoring system in accordance with the second embodiment is similar to the above-described monitoring system of the first embodiment but is different in that respective tire houses are equipped with transmitters 91, 92, 93, and 94 as shown in FIG. 7. These transmitters 91, 92, 93, and 94 are connected to the transmit/receive circuit 51 of the pneumatic tire pressure monitoring apparatus 50 via signal lines.

The contents of the program installed in the pneumatic tire pressure monitoring system 50 in accordance with the second embodiment will be explained with reference to the flowcharts shown in FIGS. 8 and 9.

Figure 8:
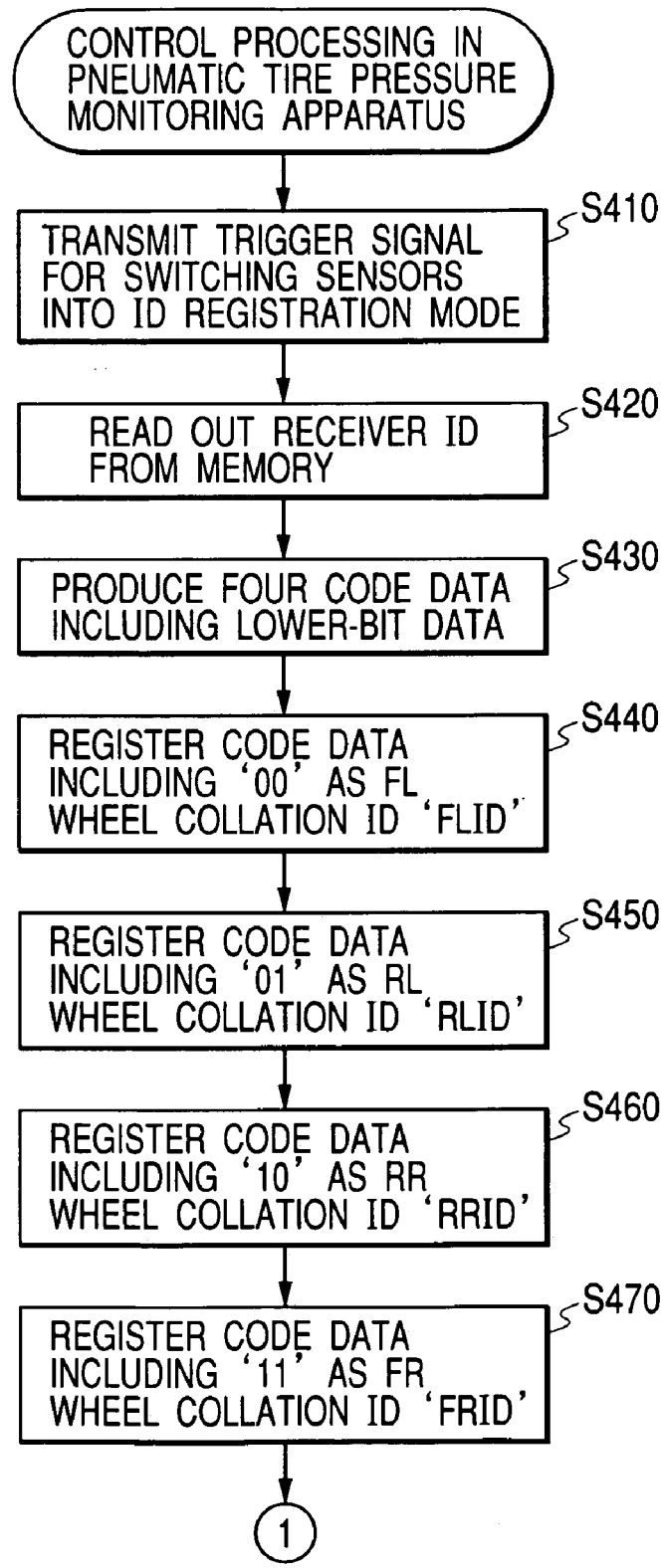
FIG. 8 is a flowchart showing the contents of control processing relating to ID registration executed in the pneumatic tire pressure monitoring apparatus in accordance with the second embodiment of the present invention.

First, as shown in FIG. 8, the trigger signal for switching respective pneumatic pressure sensors 10, 20, 30, and 40 into the ID registration mode is transmitted (step S410). This trigger signal is transmitted via the transmitters 91, 92, 93, and 94 provided in the tire houses. Next, the receiver ID is read out from the memory 55 (step S420). Then, the readout receiver ID is modified into a total of four code data by adding each of lower-bit data of '00', '01', '10', and '11' (step S430). The code data including the lower-bit '00' is registered as front-left wheel collation ID (i.e., FLID) into the memory 55 (step S440). The code data including the lower-bit '01' is registered as rear-left wheel collation ID (i.e., RLID) into the memory 55 (step S450). The code data including the lower-bit '10' is registered as rear-right wheel collation ID (i.e., RRID) into the memory 55 (step S460). And, the code data including the lower-bit '11' is registered as front-right wheel collation ID (i.e., FRID) into the memory 55 (step S470).

Figure 9:
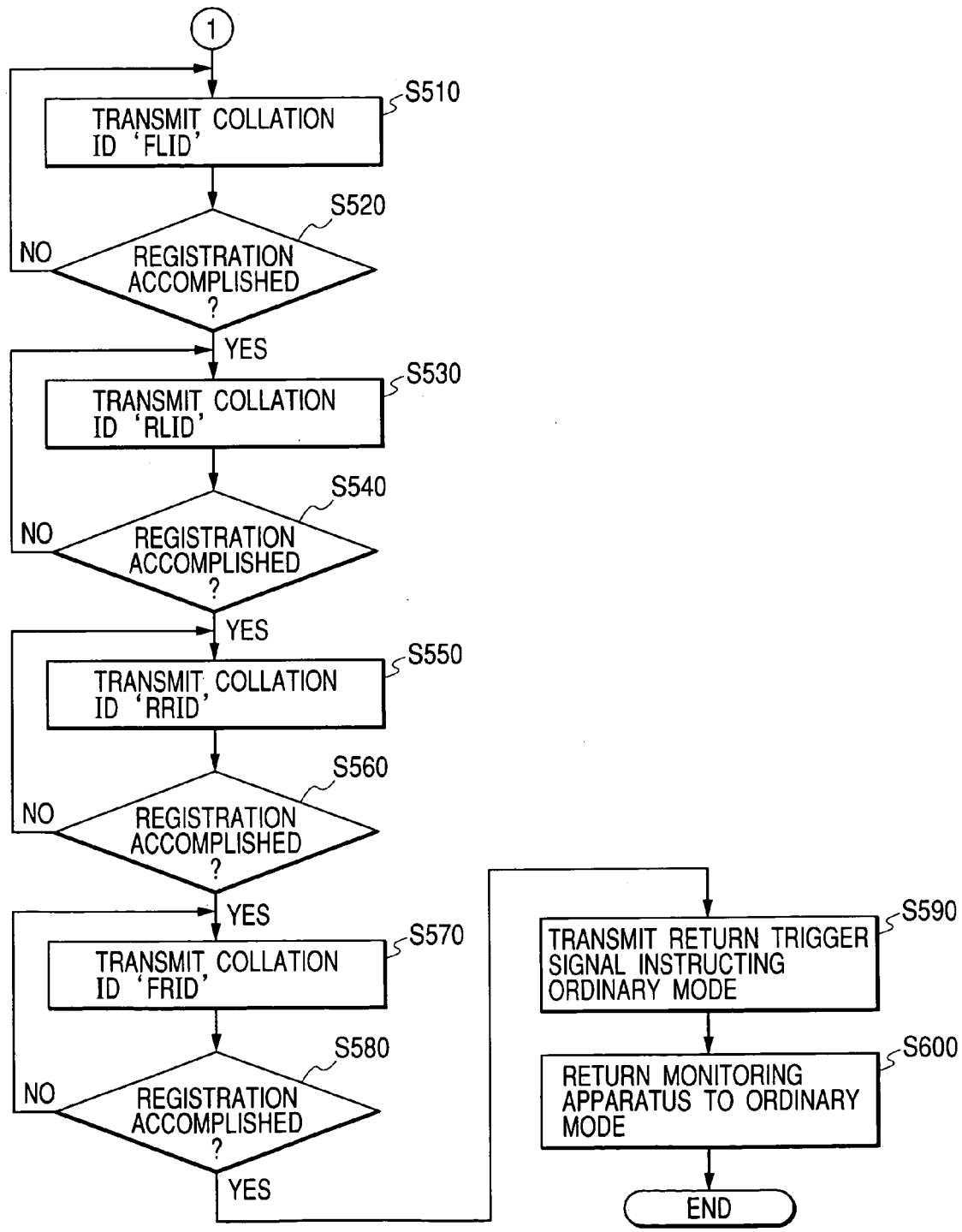
FIG. 9 is a flowchart showing the rest of the control processing relating to ID registration executed in the pneumatic tire pressure monitoring apparatus in accordance with the second embodiment of the present invention.

Then, as shown in FIG. 9, the collation ID 'FLID' corresponding to the front-left wheel's pneumatic pressure sensor is read out from the memory 55 and is transmitted to the transmitter 91 provided in the tire house of the front-left wheel (S510). Then, it is checked whether or not the completion notice of the ID registration is returned from the pneumatic pressure sensor 10 attached to the front-left wheel (step S520). When no notice is returned from the sensor 10 within a predetermined period of time (i.e., NO in step S520), the control procedure returns to the above step S510. When the completion notice of the ID registration is returned from the sensor 10 (i.e., YES in step S520), the collation ID 'RLID' corresponding to the rear-left wheel's pneumatic pressure sensor is read out from the memory 55 and is transmitted to the transmitter 92 provided in the tire house of the rear-left wheel (S530). Then, it is checked whether or not the completion notice of the ID registration is returned from the pneumatic pressure sensor 20 attached to the rear-left wheel (step S540). When no notice is returned from the sensor 20 within a predetermined period of time (i.e., NO in step S540), the control procedure returns to the above step S530. When the completion notice of the ID registration is returned from the sensor 20 (i.e., YES in step S540), the collation ID 'RRID' corresponding to the rear-right wheel's pneumatic pressure sensor is read out from the memory 55 and is transmitted to the transmitter 93 provided in the tire house of the rear-right wheel (S550). Then, it is checked whether or not the completion notice of the ID registration is returned from the pneumatic pressure sensor 30 attached to the rear-right wheel (step S550). When no notice is returned from the sensor 30 within a predetermined period of time (i.e., NO in step S560), the control procedure returns to the above step S550. When the completion notice of the ID registration is returned from the sensor 30 (i.e., YES in step S560), the collation ID 'FRID' corresponding to the front-right wheel's pneumatic pressure sensor is read out from the memory 55 and is transmitted to the transmitter 94 provided in the tire house of the rear-right wheel (S570). Then, it is checked whether or not the completion notice of the ID registration is returned from the pneumatic pressure sensor 40 attached to the front-right wheel (step S580). When no notice is returned from the sensor 40 within a predetermined period of time (i.e., NO in step S580), the control procedure returns to the above step S570. When the completion notice of the ID registration is returned from the sensor 40 (i.e., YES in step S580), the return trigger signal for returning respective pneumatic pressure sensors 10, 20, 30, and 40 to the ordinary mode is transmitted to respective transmitters 91, 92, 93, and 94 (step S590). The monitoring apparatus 50 is also returned to the ordinary mode (step S600). Thus, the ID transmission mode processing is accomplished.

The program installed in respective pneumatic pressure sensors 10, 20, 30, and 40 is similar to that of the first embodiment. According to the second embodiment, in addition to the effects of the first embodiment, it becomes possible to register the transmitter ID specifying the wheel position because the receiver IDs of respective sensors 10, 20, 30, and 40 include the lower-bit data representing the wheel position. Accordingly, the monitoring result with respect to the pneumatic tire pressure can be shown together with the wheel position on the monitor. As the receiver ID is simply produced by adding two lower bits, it is possible to suppress the bit number of the data constituting the transmitter ID.

Next, a third embodiment of the present invention will be explained with reference to FIG. 10. The pneumatic tire pressure monitoring system in accordance with the third embodiment includes an ID registration tool 60 in addition to the pneumatic pressure sensors 10, 20, 30, and 40 and the pneumatic tire pressure monitoring apparatus 50 which are already explained in the first embodiment.

Figure 10:
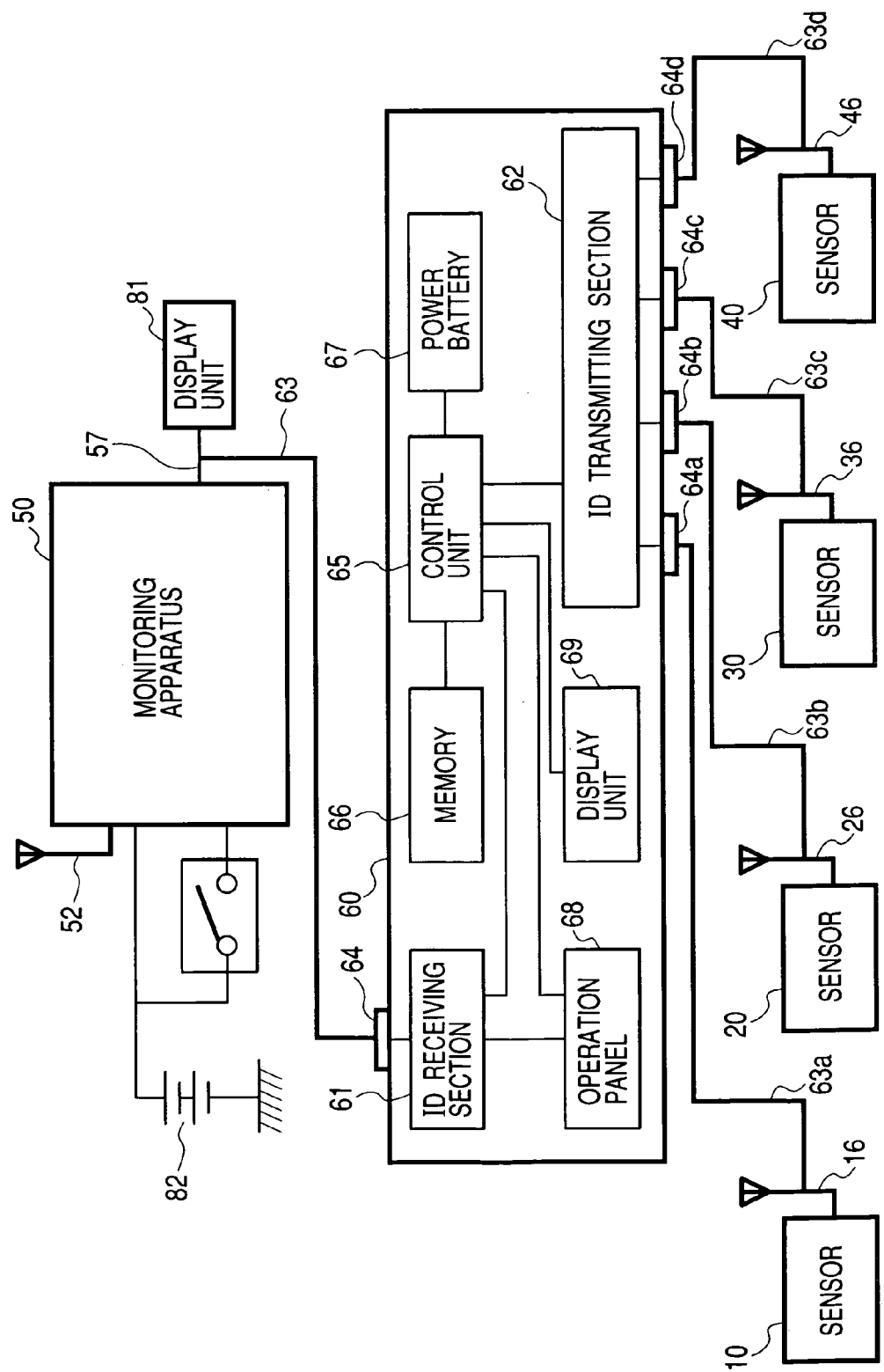
FIG. 10 is a block diagram showing a pneumatic tire pressure monitoring system including an ID registration tool in accordance with a third embodiment of the present invention.

As shown in FIG. 10, the ID registration tool 60 includes an ID receiving section 61 and an ID transmitting section 62. The ID receiving section 61 receives the transmitter ID of each wheel produced based on the receiver ID by the pneumatic tire pressure monitoring apparatus 50. The ID transmitting section 62 transmits the transmitter ID, received by the ID receiving section 61, to respective pneumatic pressure sensors 10, 20, 30, and 40. Furthermore, the ID registration tool 60 has connectors 64 and 64a–64d of signal lines 63 and 63a–63d connecting the ID registration tool 60 to the pneumatic tire pressure monitoring apparatus 50 and to respective pneumatic pressure sensors 10, 20, 30, and 40. The signal lines 63 and 63a–63d have front ends each being configured into an alligator clip which are detachably connected to the signal line 57 extending from the communication circuit 56 of the pneumatic tire pressure monitoring apparatus 50 to the display unit 81 and to antennas 16, 26, 36, and 46 of the pneumatic pressure sensors 10, 20, 30, and 40.

Furthermore, the ID registration tool 60 includes a control unit 65, a memory 66, a power source battery 67, an operation panel 68, and a display unit 69. The control unit 65, constituted by a microcomputer including CPU, ROM, and RAM, performs the controls of various processes to be executed through the ID registration tool 60. The memory 66 is an EEPROM (i.e., electrically erasable and programmable ROM) or a flash memory, and a DRAM (i.e., dynamic RAM). The power source battery 67 is a dry cell, a button cell or the like. The operation panel 68 is equipped with operation keys allowing an operator to instruct the contents of the processing to be executed through the ID registration tool 60. The display unit 69, for example constituted by an LCD, displays ID data received by the ID receiving section 61 or displays the operation mode of the ID registration tool 60.

Figure 11:
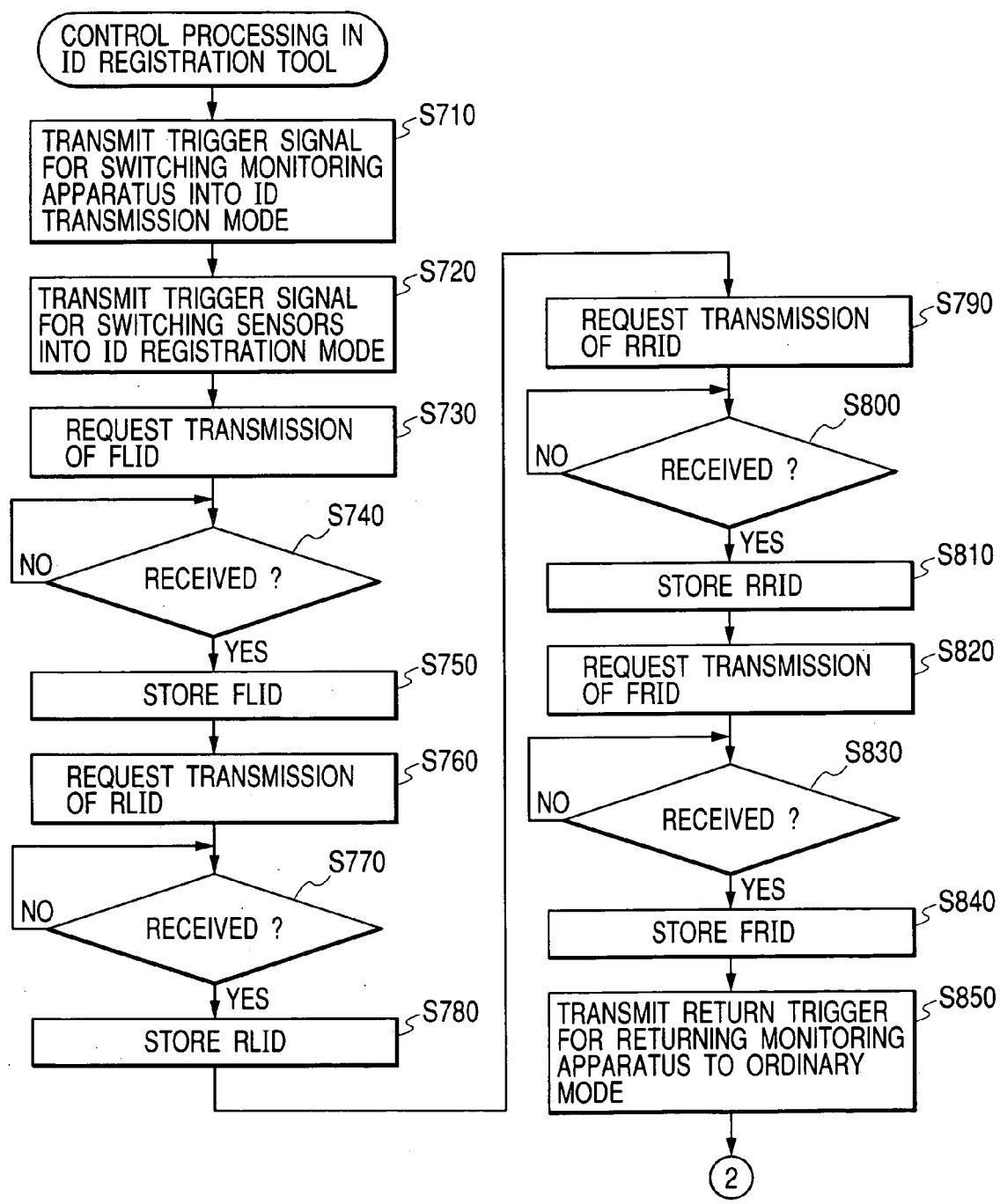
FIG. 11 is a flowchart showing the contents of control processing of ID registration tool in accordance with the third embodiment of the present invention.

The contents of the program installed in the ID registration tool 60 in accordance with the third embodiment will be explained with reference to the flowcharts shown in FIGS. 11 and 12.

Depressing a predetermined button provided on the operation panel 68 of the ID registration tool 60 runs the following program. According to this program, as shown in FIG. 11, the trigger signal for switching the pneumatic tire pressure monitoring apparatus 50 into the ID transmission mode is transmitted (step S710). Furthermore, the trigger signal for switching respective pneumatic pressure sensors 10, 20, 30, and 40 into the ID registration mode is transmitted (step S720).

Next, a command instructing transmission of the transmitter ID of the front left wheel (i.e., FLID) is transmitted to the pneumatic tire pressure monitoring apparatus 50 (step S730). When the FLID is received from the monitoring apparatus 50 (i.e., YES in step S740), the received data (i.e., FLID) is stored in the memory 66 in connection with the corresponding tire position FL (step S750). Next, a command instructing transmission of the transmitter ID of the rear left wheel (i.e., RLID) is transmitted to the pneumatic tire pressure monitoring apparatus 50 (step S760). When the RLID is received from the monitoring apparatus 50 (i.e., YES in step S770), the received data (i.e., RLID) is stored in the memory 66 in connection with the corresponding tire position RL (step S780). Next, a command instructing transmission of the transmitter ID of the rear right wheel (i.e., RRID) is transmitted to the pneumatic tire pressure monitoring apparatus 50 (step S790). When the RRID is received from the monitoring apparatus 50 (i.e., YES in step S800), the received data (i.e., RRID) is stored in the memory 66 in connection with the corresponding tire position RR (step S810). Next, a command instructing transmission of the transmitter ID of the front right wheel (i.e., FRID) is transmitted to the pneumatic tire pressure monitoring apparatus 50 (step S820). When the FRID is received from the monitoring apparatus 50 (i.e., YES in step S830), the received data (i.e., FRID) is stored in the memory 66 in connection with the corresponding tire position FR (step S840). Then, the return trigger signal is sent to the pneumatic tire pressure monitoring apparatus 50 to return its operation to the ordinary mode (step S850).

Figure 12:
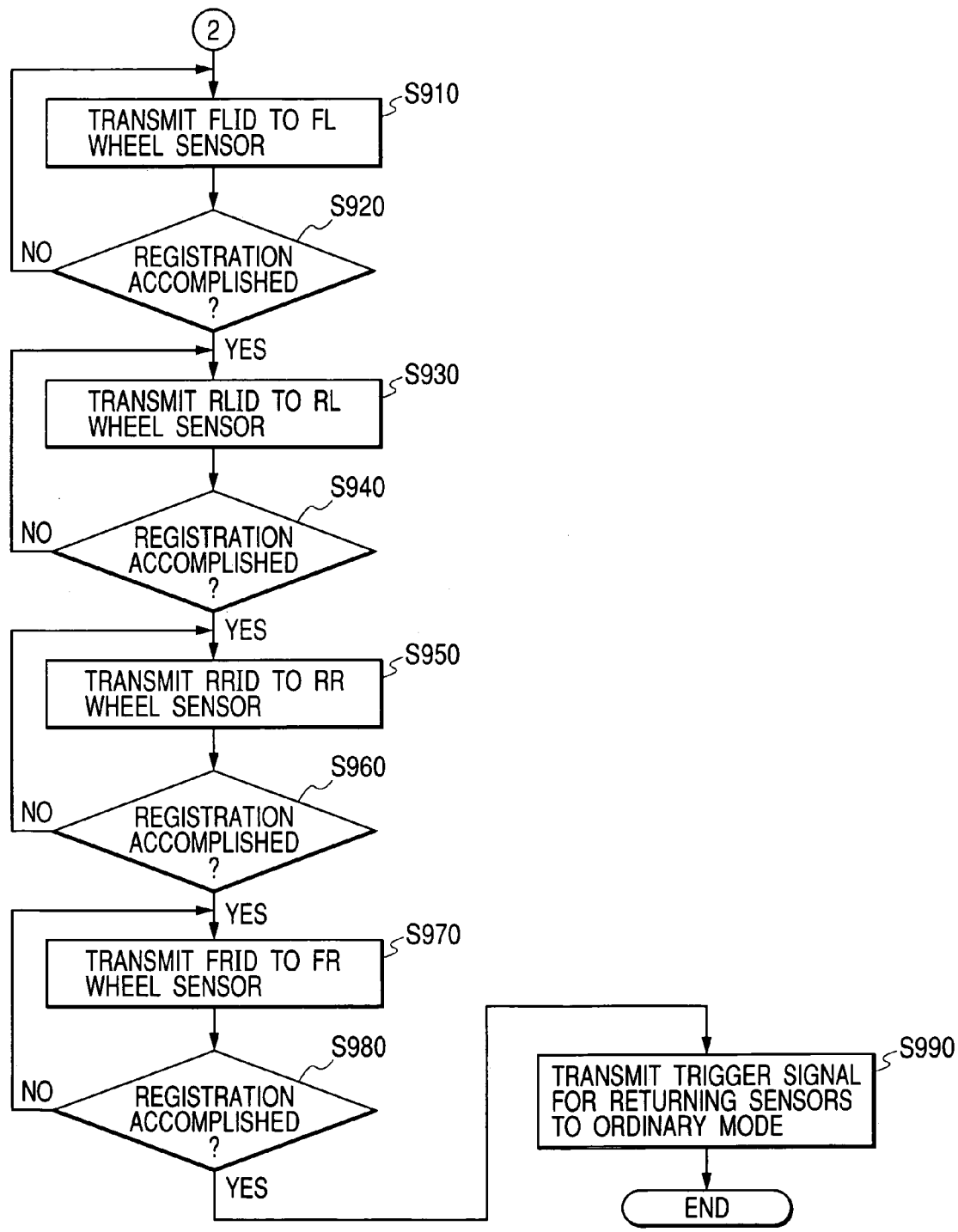
FIG. 12 is a flowchart showing the rest of the control processing of the ID registration tool in accordance with the third embodiment of the present invention.

Next, as shown in FIG. 12, the FLID is read out from the memory 66 and is transmitted to the pneumatic pressure sensor 10 of the front left wheel (step S910). Then, it is checked whether or not the completion notice of the ID registration is returned from the pneumatic pressure sensor 10 (step S920). When no notice is returned from the sensor 10 within a predetermined period of time (i.e., NO in step S920), the control procedure returns to the above step S910. When the completion notice of the ID registration is returned from the sensor 10 (i.e., YES in step S920), the RLID is read out from the memory 66 and is transmitted to the pneumatic pressure sensor 20 of the rear left wheel (step S930). Then, it is checked whether or not the completion notice of the ID registration is returned from the pneumatic pressure sensor 20 (step S940). When no notice is returned from the sensor 20 within a predetermined period of time (i.e., NO in step S940), the control procedure returns to the above step S930. When the completion notice of the ID registration is returned from the sensor 20 (i.e., YES in step S940), the RRID is read out from the memory 66 and is transmitted to the pneumatic pressure sensor 30 of the rear right wheel (step S950). Then, it is checked whether or not the completion notice of the ID registration is returned from the pneumatic pressure sensor 30 (step S960). When no notice is returned from the sensor 30 within a predetermined period of time (i.e., NO in step S960), the control procedure returns to the above step S950. When the completion notice of the ID registration is returned from the sensor 30 (i.e., YES in step S960), the FRID is read out from the memory 66 and is transmitted to the pneumatic pressure sensor 40 of the front right wheel (step S970). Then, it is checked whether or not the completion notice of the ID registration is returned from the pneumatic pressure sensor 40 (step S980). When no notice is returned from the sensor 40 within a predetermined period of time (i.e., NO in step S980), the control procedure returns to the above step S970. When the completion notice of the ID registration is returned from the sensor 40 (i.e., YES in step S980), the return trigger signal is sent to respective pneumatic pressure sensors 10, 20, 30, and 40 to return their operation to the ordinary mode (step S990).

Figure 13:
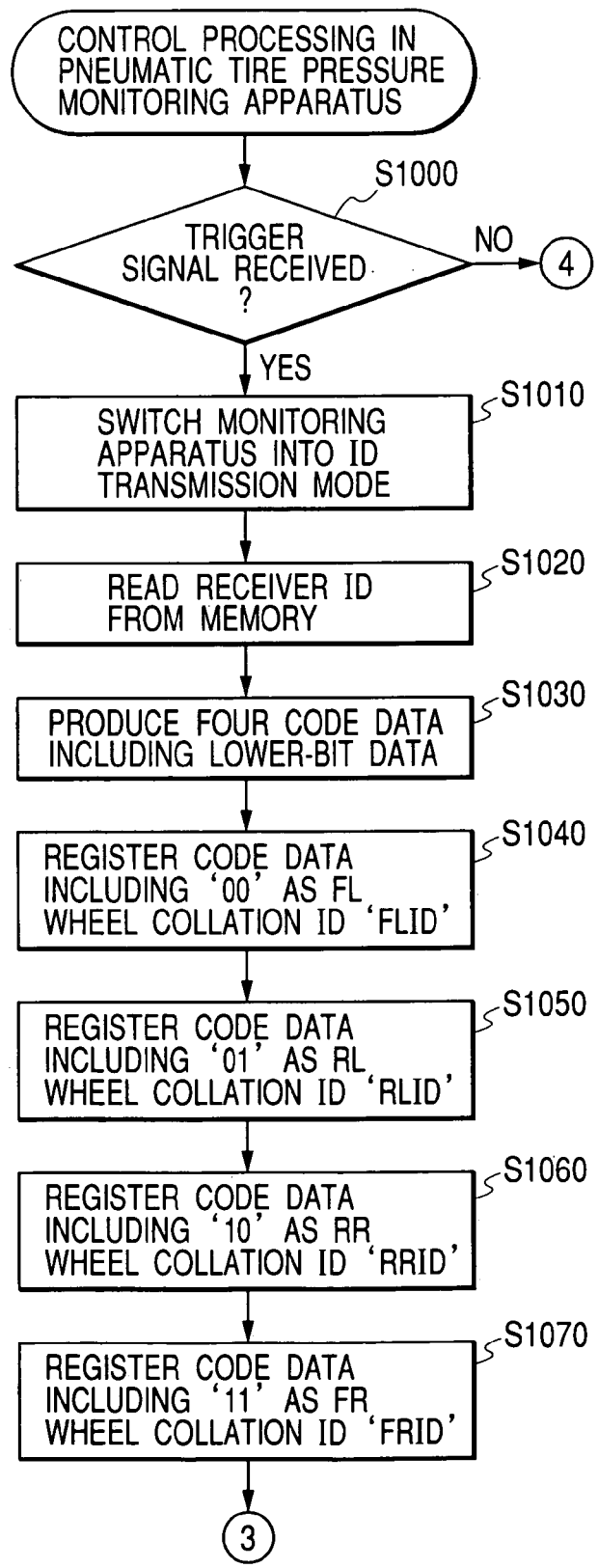
FIG. 13 is a flowchart showing the contents of control processing executed in the pneumatic tire pressure monitoring system in accordance with the third embodiment of the present invention.
Figure 14:
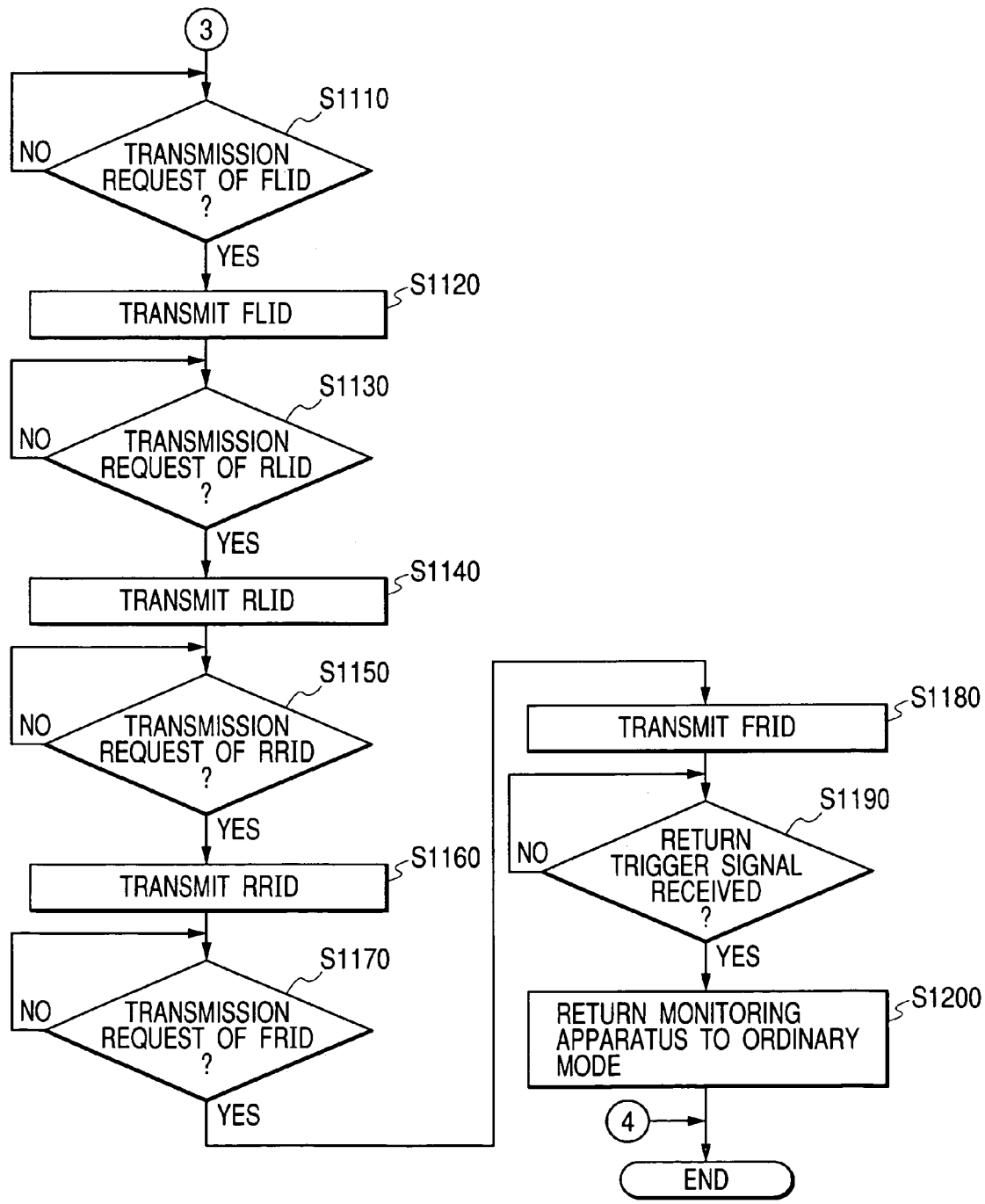
FIG. 14 is a flowchart showing the rest of the control processing executed in the pneumatic tire pressure monitoring system in accordance with the third embodiment of the present invention.

Next, the contents of the control processing executed in the pneumatic tire pressure monitoring apparatus 50 will be explained with reference to the flowcharts shown in FIGS. 13 and 14. First, it is checked whether or not the trigger signal for switching the operation to the ID transmission mode has been received (step S1000). When no trigger signal is not received (i.e., NO in step S1000), this processing is terminated. When the trigger signal is received (i.e., YES in step S1000), the pneumatic tire pressure monitoring apparatus 50 is switched into the ID transmission mode (step S1010). Then, the receiver ID is read out from the memory 55 (step S1020). Then, the readout receiver ID is modified into a total of four code data by adding each of lower-bit data of '00', '01', '10', and '11' (step S1030). The code data including the lower-bit '00' is registered as front-left wheel collation ID (i.e., FLID) into the memory 55 (step S1040). The code data including the lower-bit '01' is registered as rear-left wheel collation ID (i.e., RLID) into the memory 55 (step S1050). The code data including the lower-bit '10' is registered as rear-right wheel collation ID (i.e., RRID) into the memory 55 (step S1060). And, the code data including the lower-bit '11' is registered as front-right wheel collation ID (i.e., FRID) into the memory 55 (step S1070).

Next, it is checked whether or not the command instructing transmission of the front left wheel's transmitter ID 'FLID' has been received (step S1110). When this command has been received (i.e., YES in step S1110), the FLID is read out from the memory 55 and is transmitted to the ID registration tool 60 (step S1120). Next, it is checked whether or not the command instructing transmission of the rear left wheel's transmitter ID 'RLID' has been received (step S1130). When this command has been received (i.e., YES in step S1130), the RLID is read out from the memory 55 and is transmitted to the ID registration tool 60 (step S1140). Next, it is checked whether or not the command instructing transmission of the rear right wheel's transmitter ID 'RRID' has been received (step S1150). When this command has been received (i.e., YES in step S1150), the RRID is read out from the memory 55 and is transmitted to the ID registration tool 60 (step S1160). Next, it is checked whether or not the command instructing transmission of the front right wheel's transmitter ID 'FRID' has been received (step S1170). When this command has been received (i.e., YES in step S1170), the FRID is read out from the memory 55 and is transmitted to the ID registration tool 60 (step S1180). Then, it is checked whether or not the return trigger signal for returning the operation to the ordinary mode has been received (step S1190). When the return trigger signal is received (i.e., YES in step S1190), the pneumatic tire pressure monitoring apparatus 50 is returned to the ordinary mode (step S1200). Thus, the ID transmission mode processing is accomplished.

The program installed in respective pneumatic pressure sensors 10, 20, 30, and 40 is similar to that of the first embodiment. According to the third embodiment, in addition to the effects of the first embodiment, it becomes possible to register the ID data of respective pneumatic pressure sensors in connection with their tire positions FL, RL, RR and FR as a result of the above-described control processing executed by the combination of the ID registration tool 60, the pneumatic tire pressure monitoring apparatus 50, and respective pneumatic pressure sensors 10, 20, 30 and 40. Thus, it becomes possible to eliminate erroneous registration caused by interference in radio data transmission or prevent other radio waves from interrupting the ID registration. Furthermore, in the case that tires are exchanged, executing the above-described control processing for the exchanged sensor makes it possible to correctly register a collation ID stored in the monitoring apparatus 50 to the sensor of a newly installed tire. Furthermore, in the case of performing the position rotation of the tires, the ID registration can be repetitively and accurately performed in accordance with the changed tire position.

Figure 15:
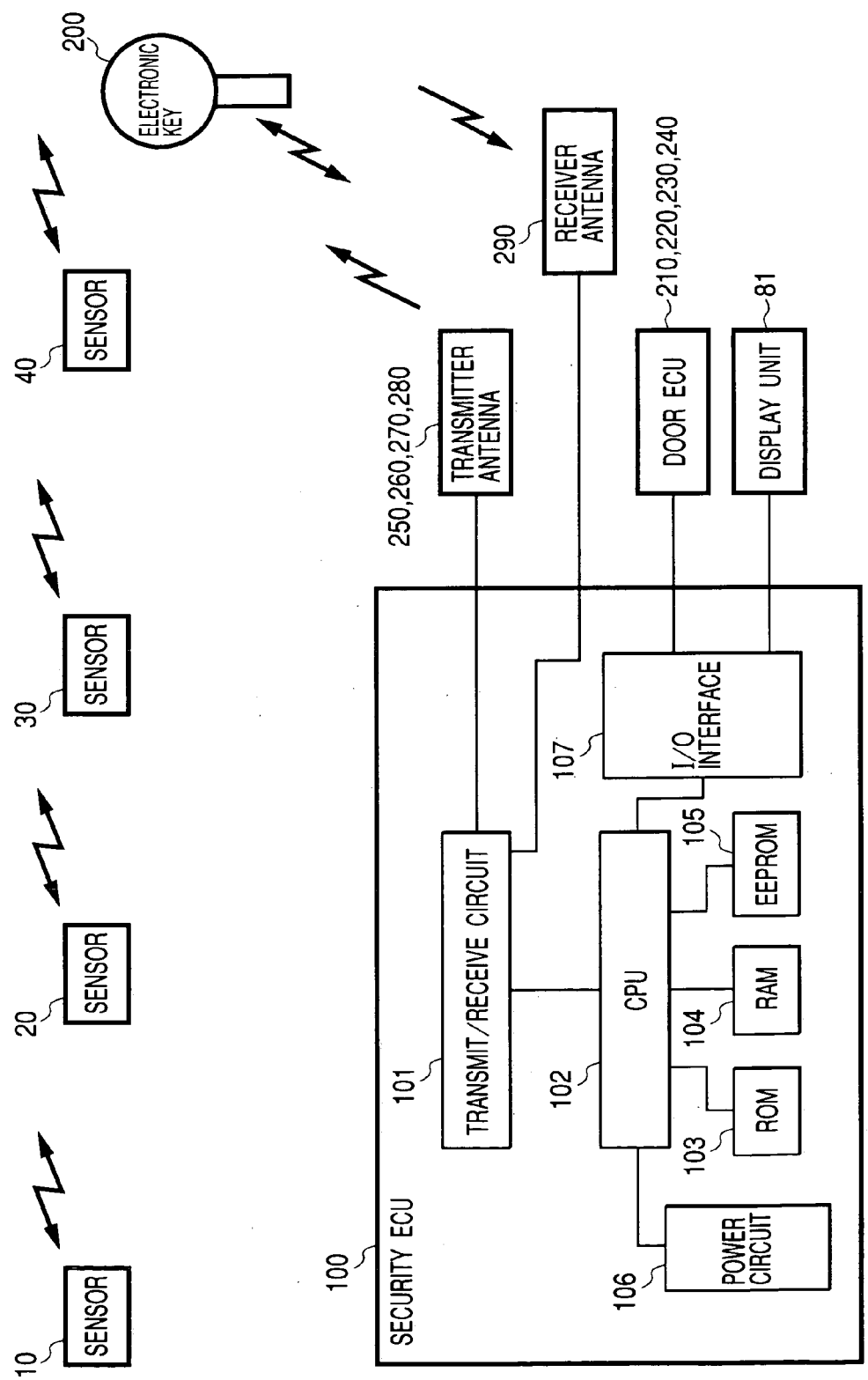
FIG. 15 is a block diagram showing a security control system in accordance with a fourth embodiment of the present invention.

Next, a fourth embodiment of the present invention will be explained. The pneumatic tire pressure monitoring system in accordance with the fourth embodiment is associated with a keyless entry apparatus so as to function as a security control system. The keyless entry apparatus allows a car user carrying an electronic key to lock/unlock the vehicle door without directly touching the door. As shown in FIG. 15, the security control system of the fourth embodiment includes the pneumatic pressure sensors (transmitters) 10, 20, 30, and 40 attached to respective tires, a security ECU (electronic control unit) 100 installed in the vehicle body, door ECUs 210, 220, 230, and 240 equipped in respective doors, transmitter antennas 250, 260, 270, and 280 provided in respective doors, a receiver antenna 290, the display unit 81, and an electronic key 200. The pneumatic pressure sensors 10, 20, 30, and 40 are identical in arrangement with those disclosed in the first embodiment.

The security ECU 100 includes a transmit/receive circuit 101, CPU 102, RPM 103, RAM 104, EEPROM 105, a power source circuit 106, and an input/output circuit 107. The display unit 81 and the door ECUs 210, 220, 230, and 240 are connected to the input/output interface 107 of the security ECU 100. The transmitter antennas 250, 260, 270, and 280 and the receiver antenna 290 are connected to the transmit/receive circuit 101. An ID assigned inherently to this security ECU 100, i.e., receiver ID, is stored in the ROM 103.

The electronic key 200 is, for example, a compact electronic unit installed at the top of a vehicle key to be inserted into a key cylinder. The electronic key 200 incorporates EEPROM, CPU or the like to register its ID and is constituted so as to execute radio (or wireless) transmit/receive operation of information or data.

Figure 16:
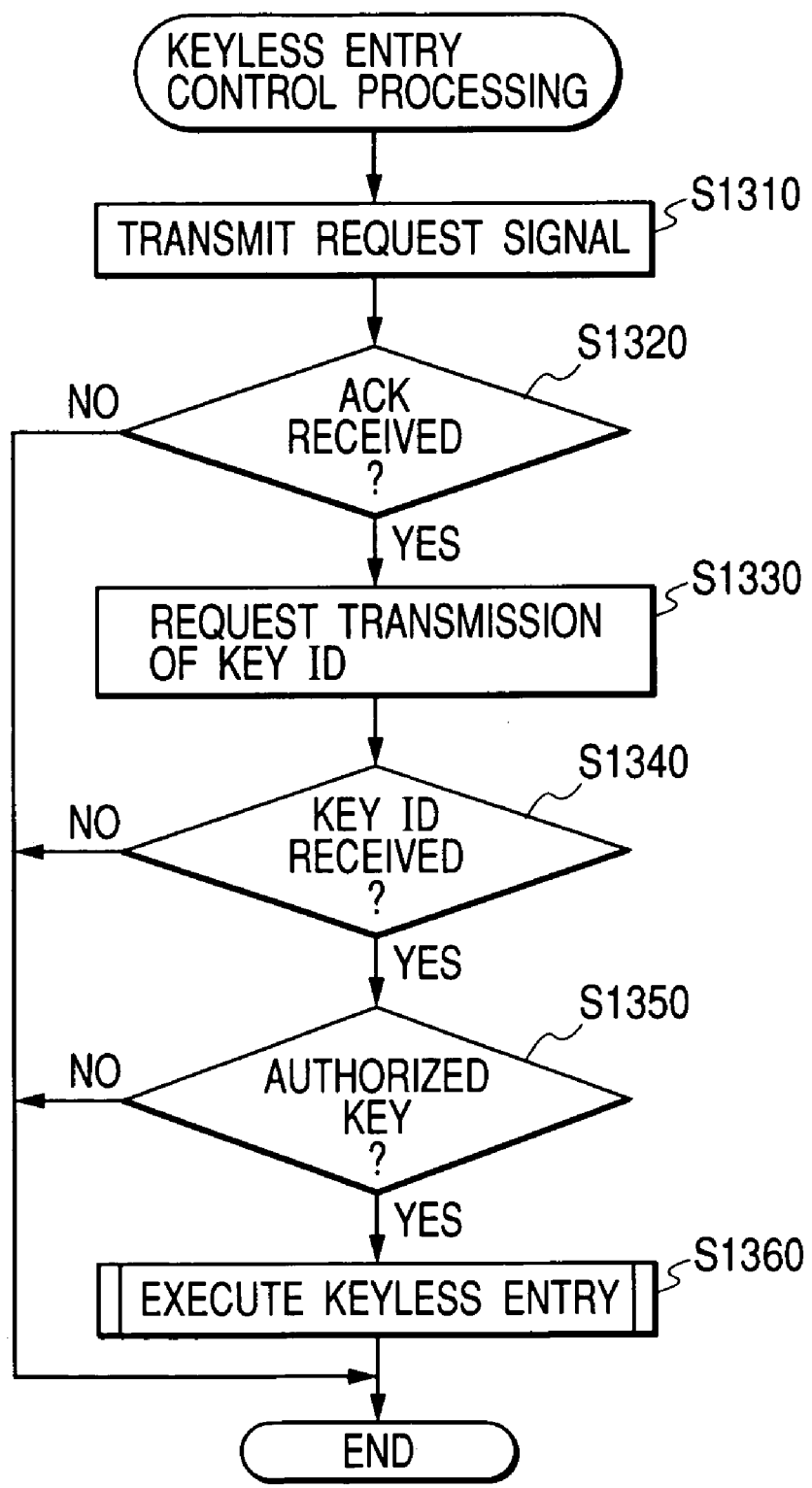
FIG. 16 is a flowchart showing the contents of keyless entry processing in accordance with the fourth embodiment of the present invention.

The security control system not only functions as the pneumatic tire pressure monitoring system which executes the control processing shown in FIG. 3 but also functions as the keyless entry system which executes the control processing shown in FIG. 16. According to the keyless entry processing shown in FIG. 16, a request signal having a predetermined frequency is transmitted at predetermined time intervals (step S1310). The generation of this request signal is for confirming whether or not the authorized electronic key 200 exists within a predetermined peripheral area of the vehicle. Then, it is checked whether or not the receiver antenna 290 has received an acknowledge signal (ACK) corresponding to this request signal within the predetermined time (step S1320). When no ACK is received (i.e., NO in step S1320), this processing is terminated. On the other hand, when the ACK is received (i.e., YES in step S1320), the receiving processing starts by transmitting a request signal requesting transmission of a key ID used in the key collation (step S1330). When the key ID in response to this request signal is received (i.e., YES in step S1340), the key collation is executed (step S1350). When the detected electronic key 200 is an authorized one (i.e., YES in step S1350), predetermined keyless entry operation is executed (step S1360). The keyless entry operation includes check of a human sensor provided in the vicinity of a door handgrip, judgment of lock/unlock to be executed, and generation of a control command to the door ECU 210 or others based on the judgment result.

According to this embodiment, the receiver ID assigned inherently to the security ECU 100 is commonly used as collation ID for the pneumatic tire pressure monitoring processing and for the keyless entry processing. Accordingly, the receiver ID of the security ECU 100 is registered as transmitter ID of respective sensors 10, 20, 30, and 40 and of the electronic key 200. The registration procedure for the pneumatic pressure sensors 10, 20, 30, and 40 is identical with that already explained in the first embodiment. Regarding the electronic key 200, the transmitter ID is registered in the following manner.

Figure 17:
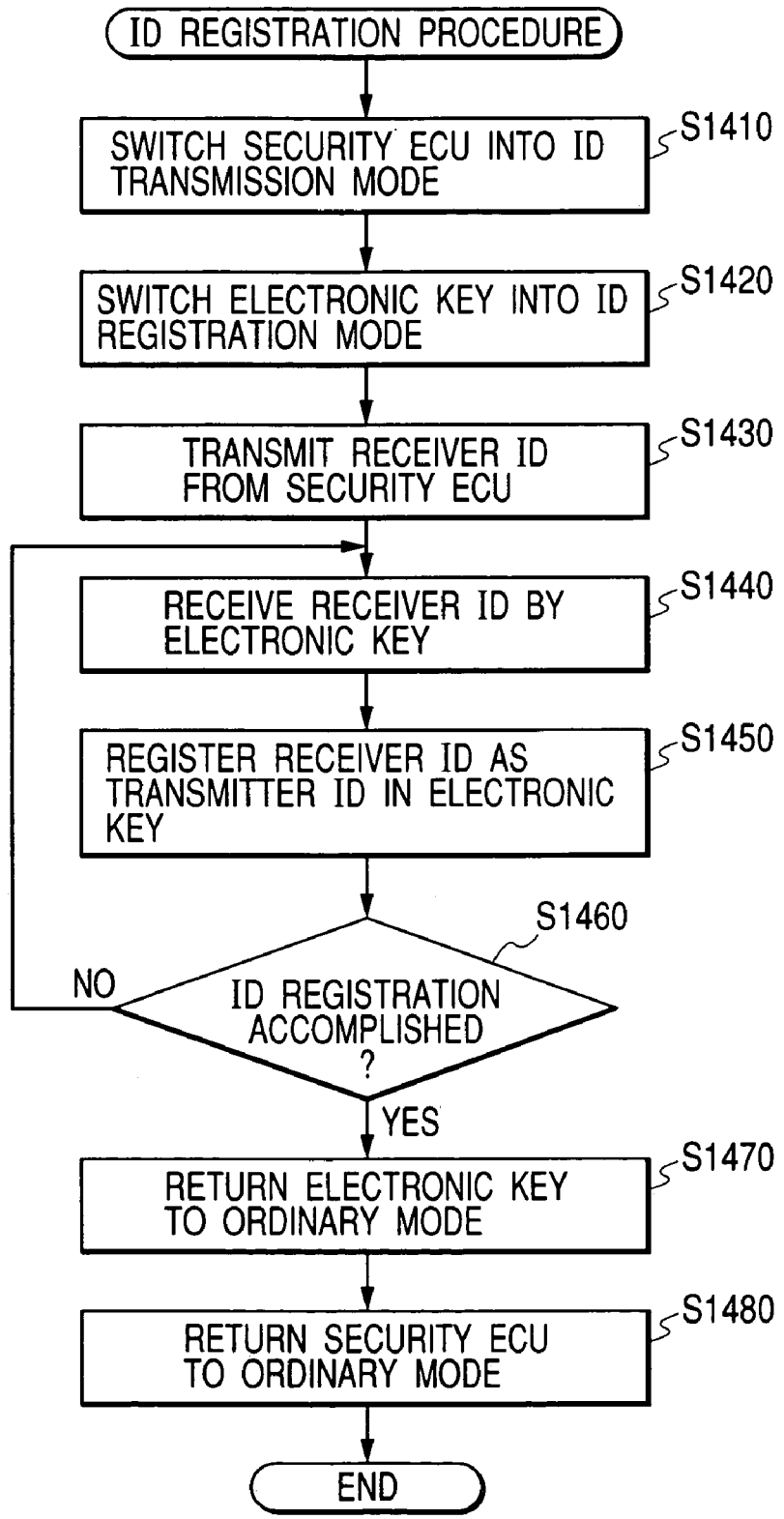
FIG. 17 is a flowchart showing ID registration procedure in accordance with the fourth embodiment of the present invention.

FIG. 17 shows the ID registration procedure for the electronic key 200. First of all, the security ECU 100 is switched into the ID transmission mode (step S1410). Next, the electronic key 200 is switched into the ID registration mode (step S1420). Then, the security ECU 100 transmits the receiver ID (step S1430). The electronic key 200 receives the receiver ID being thus transmitted from the security ECU 100 (step S1440). The electronic key 200 registers the received receiver ID as its transmitter ID and stores the registered transmitter ID into EEPROM (step S1450). When the ID registration of the electronic key 200 is accomplished (YES in step S1460), the electronic key 200 resumes the ordinary mode (step S1470) and the security ECU 100 resumes the ordinary mode (step S1480). Thus, the ID registration processing is accomplished.

Next, the program installed in the security ECU 100 for executing the above-described registration processing will be explained with reference to the flowchart shown in FIG. 18. Depressing a predetermined button provided on an operation panel of the security ECU 100 runs the following program. The depression of this button also makes the security ECU 100 change its operation from the ordinary mode to the ID transmission mode.

Figure 18:
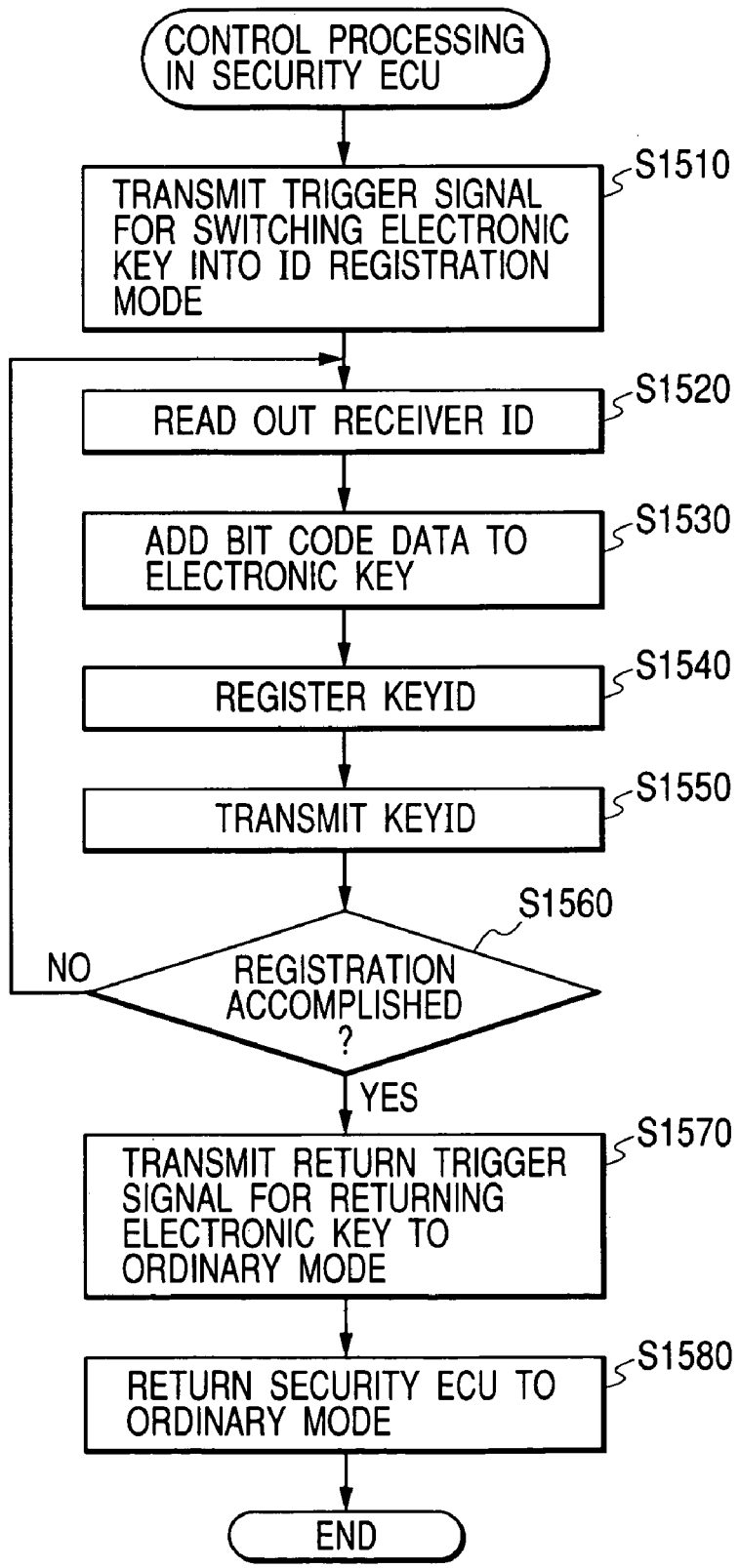
FIG. 18 is a flowchart showing contents of control processing relating to ID registration to an electronic key executed by the security control system in accordance with a fourth embodiment of the present invention.

As shown in FIG. 18, the ID transmission mode processing for the electronic key 200 includes transmission of a trigger signal for switching the electronic key 200 into the ID registration mode (step S1510). The frequency of this trigger signal is identical with that used in the keyless entry processing explained with reference to FIG. 16. Next, the receiver ID registered in the ROM 103 is read out (step S1520). Then, a predetermined bit number of code data is added to the readout receiver ID to produce a transmitter ID 'KEYID' for the electronic key 200 (step S1530). The predetermined bit number of code data being thus included in the transmitter ID 'KEYID' is for discriminating the transmitter ID 'KEYID' from the transmitter IDs assigned to respective pneumatic pressure sensors explained in the above-described second embodiment. The transmitter ID 'KEYID' of the electronic key 200 is registered in the EEPROM 105 (step S1540). The KEYID is transmitted as a signal having the same frequency as that used in the keyless entry processing (step S1550). Then, it is checked whether or not a reply with respect to completion of the ID registration has arrived from the electronic key 200 (step S1560). When no reply has arrived during a predetermined period of time (i.e., NO in step S1560), the control procedure returns to the above step S1520. On the other hand, when the reply with respect to completion of the ID registration has arrived (i.e., YES in step S1560), a return trigger signal for returning the electronic key 200 to the ordinary mode is transmitted (step S1570). The security ECU 100 is returned to the ordinary mode (step S1580). Thus, the ID transmission mode processing for the electronic key 200 is accomplished.

Figure 19:
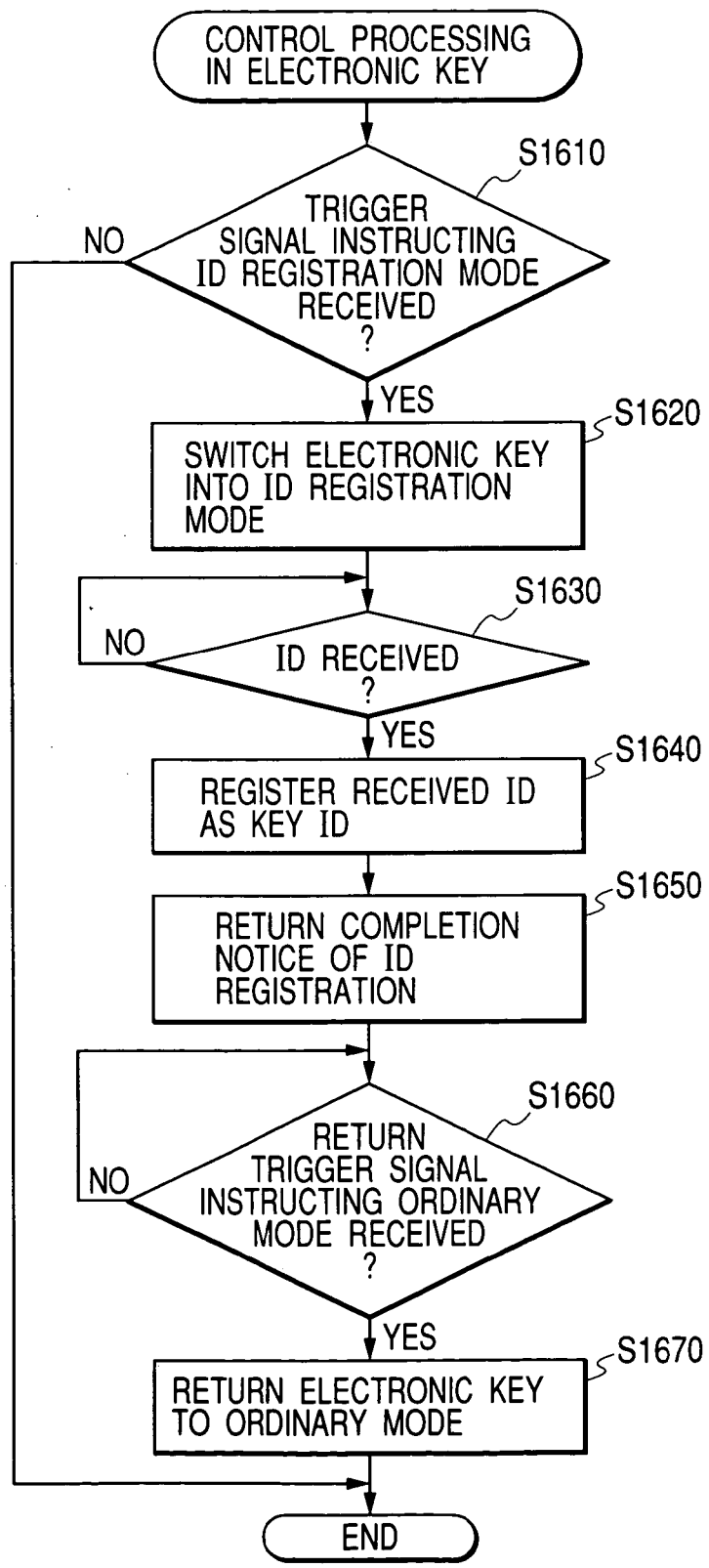
FIG. 19 is a flowchart showing the contents of control processing relating to ID registration executed by the electronic key in accordance with the fourth embodiment of the present invention.

Next, the control processing executed in the electronic key 200 will be explained with reference to FIG. 19. First of all, it is checked whether or not the trigger signal for switching the operation into the ID registration mode has been received (step S1610). When no trigger signal is received (i.e., NO in step S1610), this control processing is terminated. When the trigger signal is received (i.e., YES in step S1610), the electronic key 200 is changed into the ID registration mode (step S1620). Then, it is checked whether or not the KEYID has been received (step S1630). When the KEYID is received (i.e., YES in step S1630), the received KEYID is registered as key ID, i.e. transmitter ID, in the EEPROM (step S11640). Then, the completion notice of the ID registration is returned (step S1650). This notice is returned as a signal combined with the KEYID registered in the above step S1640. Thereafter, it is checked whether or not the return trigger signal for returning the operation to the ordinary mode has been received (step S1660). When the return trigger signal has been received (i.e., YES in step S1660), the electronic key 200 is returned to the ordinary mode (step S1670). Thus, the control processing of the electronic key 200 is accomplished.

As a result of the above-described control processing executed in the security ECU 100 and the electronic key 200, the fourth embodiment makes it possible to register the transmitter ID (i.e., KEYID) of the electronic key 200 based on the receiver ID of the security ECU 100. Furthermore, the KEYID of the electronic key 200 is identical with the receiver ID of the security ECU 100 except for the bit data added to discriminate the type of the transmitter. Thus, it becomes possible to commonly perform the collation processing for the pneumatic tire pressure monitoring system and for the keyless entry system. The software can be simplified. Especially, directly registering the receiver ID to the pneumatic pressure sensors 10, 20, 30, and 40 and to the electronic key 200 is effective in realizing more simplified system. Furthermore, using the common transmitter ID in two different systems is effective in reducing the required bit number of the transmitter ID.

The present invention is not limited to the above-described embodiments and therefore can be modified in various ways without departing from the scope of the invention.

For example, the present invention can be applied to a vehicle equipped with only a keyless entry system. Furthermore, when the ID registration tool 60 is used, it is possible to execute wireless processing for receiving the transmitter ID between the pneumatic tire pressure monitoring apparatus 50 and the ID registration tool 60 without providing the signal line connecting them. In this case, the ID registration tool 60 transmits the transmitter ID to respective pneumatic pressure sensors 10, 20, 30, and 40 by wireless.

Furthermore, when the control processing is performed based on information from a transmitter in a vehicle control other than the pneumatic tire pressure monitoring system or the keyless entry system, the collation ID of a receiver may be equalized with that of the transmitter. In such a case, the present invention is preferably employable as a vehicle control system. Meanwhile, the present invention can be also applied to ID registration for a system other than the vehicle.

Furthermore, the ID registered in the transmitter needs not be based on the receiver ID. For example, the purpose of the present invention is accomplished by transmitting a collation ID registered in the receiver to the transmitter and registering it as transmitter ID. Namely, the present invention differs from the conventional ID registration method according to which the ID of a transmitter is registered in a receiver. According to the present invention, the ID information registered in a receiver is registered in a transmitter. The ID registration according to the present invention is superior to the conventional method in that the ID registration can be accurately performed between the transmitter and the receiver even in the case that an additional transmitter is newly added or the transmitter is modified.

What is claimed is:

1. An ID registration method for an ID collation system which includes a receiver receiving information transmitted from a transmitter, comprising the steps of:

causing said receiver to transmit a collation ID to said transmitter;

causing said transmitter to receive said collation ID transmitted from said receiver and register the received collation ID as a registered ID of said transmitter;

causing said transmitter to produce transmission information including said registered ID of said transmitter and transmit said transmission information to said receiver;

causing said receiver to receive said transmission information and compare said registered ID included in said transmission information with said collation ID stored in said receiver to check whether or not said transmission information is transmitted from said transmitter; and causing said receiver to perform predetermined processing according to said transmission information when said transmission information is transmitted from said transmitter.

2. An ID collation system comprising:

a transmitter for transmitting information including a registered ID;

a receiver for receiving the information transmitted from said transmitter;

a control apparatus for checking the registered ID contained in the information received by the receiver and performing predetermined processing according to said information based on a check result of the registered ID;

a transmitter mode switching apparatus for switching said transmitter into an ID registration mode; and a receiver mode switching apparatus for switching said receiver into an ID transmission mode, wherein said receiver comprises an ID transmitting apparatus for transmitting a collation ID used in ID checking when the receiver is switched into the ID transmission mode by said receiver mode switching apparatus, and said transmitter comprises an ID receiving apparatus for receiving the collation ID transmitted from said receiver when said transmitter is switched into the ID registration mode by said transmitter mode switching apparatus, and an ID registration apparatus for registering the collation ID received by said ID receiving apparatus as the registered ID of said transmitter.

3. A vehicle control system comprising:

a transmitter installed in a vehicle for transmitting information including a registered ID which is required to control a device installed in the vehicle;

a receiver installed in the vehicle for receiving the information transmitted from said transmitter;

a control apparatus for checking the registered ID contained in the information received by the receiver with reference to a collation ID and executing control of said device according to said information based on a check result of the registered ID;

a transmitter mode switching apparatus for switching said transmitter into an ID registration mode; and a receiver mode switching apparatus for switching said receiver into an ID transmission mode, wherein said receiver comprises an ID transmitting apparatus for transmitting said collation ID used in ID checking when said receiver is switched into the ID transmission mode by said receiver mode switching apparatus, and said transmitter comprises an ID receiving apparatus for receiving said collation ID transmitted from said receiver when said transmitter is switched into the ID registration mode by said transmitter mode switching apparatus, and an ID registration apparatus for registering the collation ID received by said ID receiving apparatus as the registered ID of said transmitter, wherein said device is a pneumatic air pressure monitoring apparatus for displaying monitoring result with respect to an air pressure of a tire installed in said vehicle, said transmitter is incorporated in a pneumatic pressure sensor attached to said tire, and said control apparatus executes control for the display of monitoring result with respect to the air pressure of the tire installed in said vehicle when the information received by said receiver is confirmed based on the result of ID checking as being transmitted from the pneumatic pressure sensor attached to said tire.

4. The vehicle control system in accordance with claim 3, wherein said collation ID is transmitted to said transmitter via a transmitter antenna provided in a tire house of said vehicle.

5. A vehicle control system comprising:

a transmitter for transmitting information required to control a device installed in a vehicle;

a receiver installed in a vehicle body for receiving the information transmitted from said transmitter;

a control apparatus installed in the vehicle body for checking an ID contained in the information received by the receiver with reference to a collation ID and executing control of said device according to said information based on check result of ID;

a transmitter mode switching apparatus for switching said transmitter into an ID registration mode; and a receiver mode switching apparatus for switching said receiver into an ID transmission mode, wherein said receiver comprises an ID transmitting apparatus for transmitting said collation ID used in ID checking when said receiver is switched into the ID transmission mode by said receiver mode switching apparatus, and said transmitter comprises an ID receiving apparatus for receiving said collation ID transmitted from said receiver when said transmitter is switched into the ID registration mode by said transmitter mode switching apparatus, and an ID registration apparatus for storing the collation ID received by said ID receiving apparatus as a registered ID of said transmitter, wherein said device installed in a vehicle is a keyless entry apparatus for executing contactless lock/unlock of a vehicle door, said transmitter is incorporated in an electronic key, and said control apparatus executes the contactless lock/unlock of the vehicle door based on checking result of ID of the electronic key contained in the information received by said receiver.

6. A vehicle control system comprising:

a transmitter for transmitting information required to control a device installed in a vehicle;

a receiver installed in a vehicle body for receiving the information transmitted from said transmitter;

a control apparatus installed in the vehicle body for checking an ID contained in the information received by the receiver with reference to a collation ID and executing control of said device according to said information based on check result of ID;

a transmitter mode switching apparatus for switching said transmitter into an ID registration mode; and a receiver mode switching apparatus for switching said receiver into an ID transmission mode, wherein said receiver comprises an ID transmitting apparatus for transmitting said collation ID used in ID checking when said receiver is switched into the ID transmission mode by said receiver mode switching apparatus, and said transmitter comprises an ID receiving apparatus for receiving said collation ID transmitted from said receiver when said transmitter is switched into the ID registration mode by said transmitter mode switching apparatus, and an ID registration apparatus for storing the collation ID received by said ID receiving apparatus as a registered ID of said transmitter, wherein said device installed in a vehicle includes a pneumatic air pressure monitoring apparatus for displaying monitoring result with respect to an air pressure of a tire installed in said vehicle and a keyless entry apparatus for executing contactless lock/unlock of a vehicle door, said transmitter is incorporated in a pneumatic pressure sensor attached to said tire and also in an electronic key, and said control apparatus executes control for the display of monitoring result with respect to the air pressure of the tire installed in said vehicle when the information received by said receiver is confirmed based on the result of ID checking as being transmitted from the pneumatic pressure sensor attached to said tire, and also executes the contactless lock/unlock of the vehicle door when the information received by said receiver is confirmed based on the result of ID checking as being transmitted from an authorized electronic key.

7. The vehicle control system in accordance with claim 3, wherein said collation ID is determined based on an ID assigned inherently to said receiver.

8. The vehicle control system in accordance with claim 3, wherein said collation ID is transmitted to said transmitter via a predetermined external device.

9. The vehicle control system in accordance with claim 8, wherein said external device is detachably connected via a signal line to said receiver and to said transmitter.

10. The vehicle control system in accordance with claim 9, wherein
said transmitter mode switching apparatus is provided in said transmitter while said receiver mode switching apparatus is provided in said receiver, and
said external device comprises a trigger signal transmitting apparatus which transmits a trigger signal for causing said transmitter mode switching apparatus to switch said transmitter into the ID registration mode and a trigger signal for causing said receiver mode switching apparatus to switch said receiver into the ID transmission mode.

11. A pneumatic tire pressure monitoring apparatus comprising:
a pneumatic pressure sensor for each tire of a particular vehicle for transmitting an air-pressure signal together with a sensor ID of said pneumatic pressure sensor;
a receiver installed in the particular vehicle for receiving the air-pressure signal together with the sensor ID from one of the pneumatic pressure sensors;
a control apparatus for checking whether or not the received sensor ID agrees with the collation ID determined based on an ID assigned inherently to said receiver, and for executing control for monitoring an air pressure of said tire relating to the pneumatic pressure sensor with reference to said air-pressure signal based on check result of the received sensor ID; and
a receiver mode switching apparatus for switching said receiver into an ID transmission mode,
wherein said receiver comprises an ID transmitting apparatus for transmitting the collation ID used in ID checking when said receiver is switched into the ID transmission mode by said receiver mode switching apparatus,
and wherein each of the pneumatic pressure sensors of the tires of the particular vehicle comprises an ID receiving apparatus for receiving the collation ID transmitted from said receiver, and an ID registration apparatus for registering the collation ID received by said ID receiving apparatus as the sensor ID of the pneumatic pressure sensor.

12. A pneumatic tire pressure sensor comprising:
a pressure sensor installed in a particular vehicle for detecting an air pressure of a tire of the particular vehicle;
a receiving circuit for receiving a collation ID transmitted from a pneumatic tire pressure monitoring apparatus of the particular vehicle;
a transmitter ID registering apparatus for registering said collation ID received via said receiving circuit as a transmitter ID;
an ID memory for storing the transmitter ID registered by said transmitter ID registering apparatus; and
a transmitting circuit for transmitting a signal of the air pressure of the tire detected by said pressure sensor together with the transmitter ID stored in said ID memory to the pneumatic tire pressure monitoring apparatus, the pneumatic tire pressure monitoring apparatus checking whether or not the signal of the air pressure is transmitted from said pressure sensor by comparing the transmitter ID with the collation ID, and performing predetermined processing according to the signal of the air pressure when the signal of the air pressure is transmitted from said pressure sensor.

13. The pneumatic tire pressure sensor in accordance with claim 12, wherein
said receiving circuit receives a signal via a cable, and
said ID memory is a rewritable memory element having an overwriting function for renewing the data stored therein.

14. An ID registration tool for a pneumatic tire pressure monitoring system including a pneumatic pressure sensor attached to a tire of a vehicle and a pneumatic tire pressure monitoring apparatus installed in a vehicle body
wherein said ID registration tool comprises:
an ID transmission requesting apparatus for requesting said pneumatic tire pressure monitoring apparatus to transmit a collation ID used in ID checking;
an ID receiving circuit for receiving the collation ID transmitted from said pneumatic tire pressure monitoring apparatus in response to a request of said ID transmission requesting apparatus; and
an ID transmitting circuit for transmitting the collation ID received by said ID receiving circuit to said pneumatic pressure sensor, said pneumatic pressure sensor registering the collation ID transmitted by said ID transmitting circuit as a transmitter ID, said pneumatic pressure sensor transmitting an air-pressure signal together with the transmitter ID of said pneumatic pressure sensor to said pneumatic tire pressure monitoring apparatus, said pneumatic tire pressure monitoring apparatus receiving the air-pressure signal together with the transmitter ID, checking whether or not the received air-pressure signal is transmitted from said pneumatic pressure sensor by comparing the received transmitter ID with the collation ID, and monitoring an air pressure of the tire indicated by the air-pressure signal when the air-pressure signal is transmitted from said pneumatic pressure sensor.

15. The vehicle control system in accordance with claim 5, wherein said collation ID is determined based on an ID assigned inherently to said receiver.

16. The vehicle control system in accordance with claim 6, wherein said collation ID is determined based on an ID assigned inherently to said receiver.

17. The vehicle control system in accordance with any claim 5, wherein said collation ID is transmitted to said transmitter via a predetermined external device.

18. The vehicle control system in accordance with claim 6, wherein said collation ID is transmitted to said transmitter via a predetermined external device.

19. The ID registration method in accordance with claim 1, wherein said collation ID is determined based on an ID assigned inherently to said receiver.

20. The ID registration method in accordance with claim 1, wherein said receiver is installed in a vehicle in which said transmitter is installed.

21. The ID registration method in accordance with claim 2, wherein said collation ID is determined based on an ID assigned inherently to said receiver.

22. The ID collation system in accordance with claim 2, wherein said receiver is installed in a vehicle in which said transmitter is installed.

23. The ID registration tool in accordance with claim 14, wherein said collation ID is determined based on an ID assigned inherently to said pneumatic tire pressure monitoring apparatus.

* * * * *